(12) United States Patent
Vansickel et al.

(10) Patent No.: US 10,998,153 B2
(45) Date of Patent: May 4, 2021

(54) MODULAR ENTERTAINMENT CONTROL SYSTEM OF SNAP-MOUNTED MULTI-FUNCTIONAL MODULES WITHIN A MODULAR MOUNTING FRAME

(71) Applicant: Audio Accessories Group, LLC, Tempe, AZ (US)

(72) Inventors: Larry Vansickel, Phoenix, AZ (US); Wang Hai, Ningbo (CN); Gu Wendong, Ningbo (CN); Zhou Liang, Ningbo (CN)

(*) Notice: Subject to any disclaimer, the term of this patent is extended or adjusted under 35 U.S.C. 154(b) by 168 days.

(21) Appl. No.: 15/949,518

(22) Filed: Apr. 10, 2018

(65) Prior Publication Data
US 2019/0311868 A1    Oct. 10, 2019

(51) Int. Cl.
*B60Q 3/20* (2017.01)
*H01H 23/04* (2006.01)
(Continued)

(52) U.S. Cl.
CPC ............ *H01H 23/04* (2013.01); *H04R 3/00* (2013.01); *B60Q 3/20* (2017.02); *B60R 16/037* (2013.01); *H01H 25/008* (2013.01); *H01H 25/06* (2013.01); *H04R 2420/07* (2013.01); *H04R 2420/09* (2013.01)

(58) Field of Classification Search
CPC .......... H01H 9/02; H01H 9/0207; H01H 9/08; H01H 23/02; H01H 23/04; H01H 2221/066; B60K 37/06; B60K 2370/828; B60R 16/00; B60R 16/03
See application file for complete search history.

(56) References Cited

U.S. PATENT DOCUMENTS

| 6,486,418 B1 * | 11/2002 | Jorczak | ............... H01H 9/161 200/17 R |
| 7,475,559 B2 * | 1/2009 | Gleeson | ............ B60H 1/00585 307/10.1 |

(Continued)

FOREIGN PATENT DOCUMENTS

| CN | 201530266174.8 S | 1/2016 |
| CN | 201530265783.1 S | 7/2016 |

OTHER PUBLICATIONS

Otrattw The Switch Guys; https://www.otrattw.net/; all single action switches.

*Primary Examiner* — Vanessa Girardi
(74) *Attorney, Agent, or Firm* — Keith L. Jenkins, Registered Patent Attorney, LLC; Keith L. Jenkins

(57) ABSTRACT

Multi-functional audio and lighting devices are enclosed in snap-in modules adapted to fit in industry standard rocker switch panels. Each module has at least two functional parts. Included are auxiliary audio jacks, with USB charging ports and with or without a voltmeter; a Bluetooth transceiver with pairing and volume controls; an FM radio receiver with channel scan and a channel display; a single (dual-function) knob audio controller; a push-button audio controller; and an RGB LED controller with color, flash, and speed controls. A modular rocker switch panel that can be configured for two or more switches is presented. Various numbers and types of multi-function modules can be configured in a panel to customize an entertainment system. The modules are preferably marine grade and may have optional tethered water resistant covers.

20 Claims, 23 Drawing Sheets

(51) Int. Cl.
*H04R 3/00* (2006.01)
*H01H 25/00* (2006.01)
*B60R 16/037* (2006.01)
*H01H 25/06* (2006.01)

(56) References Cited

U.S. PATENT DOCUMENTS 7,867,040 B2 * 1/2011 Yu ..................... H01R 13/518
 439/701
8,968,006 B1 * 3/2015 Holec ................... H01R 4/02
 439/65

* cited by examiner

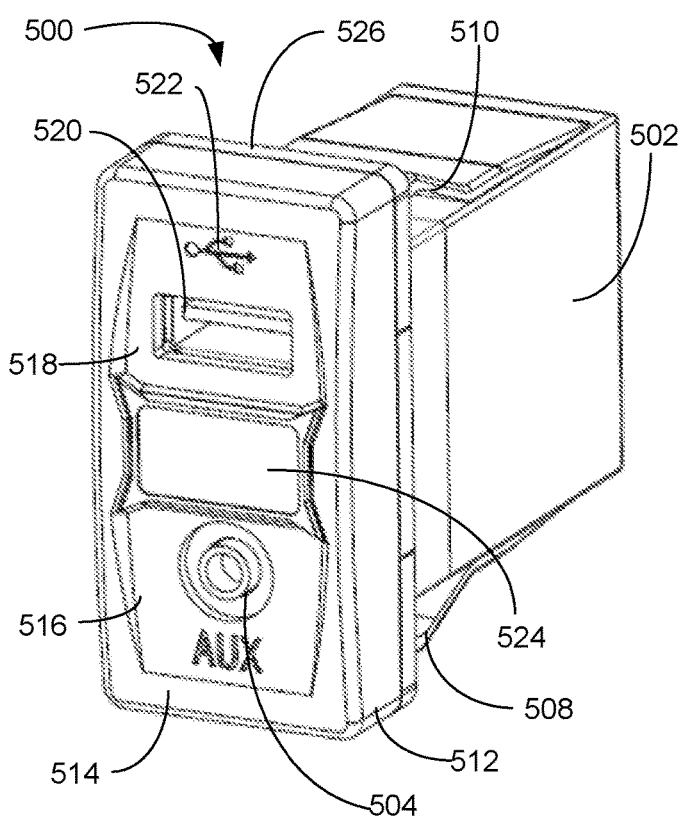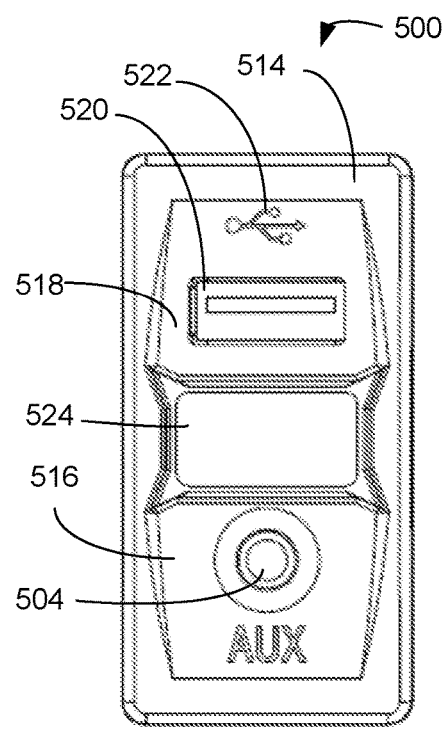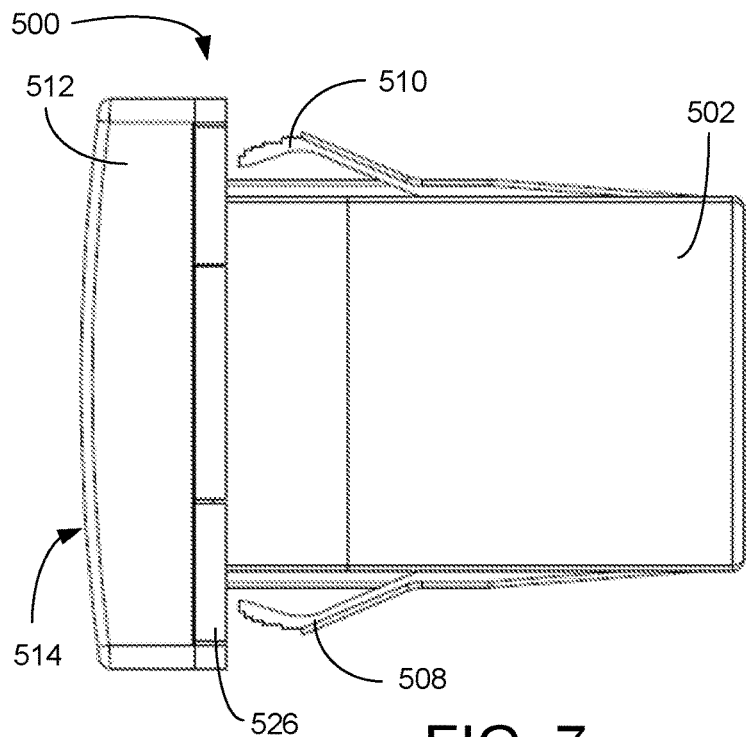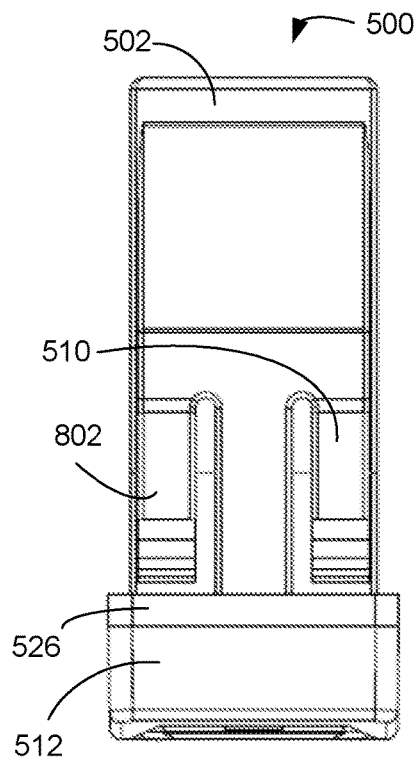
FIG. 5
FIG. 6
FIG. 7
FIG. 8

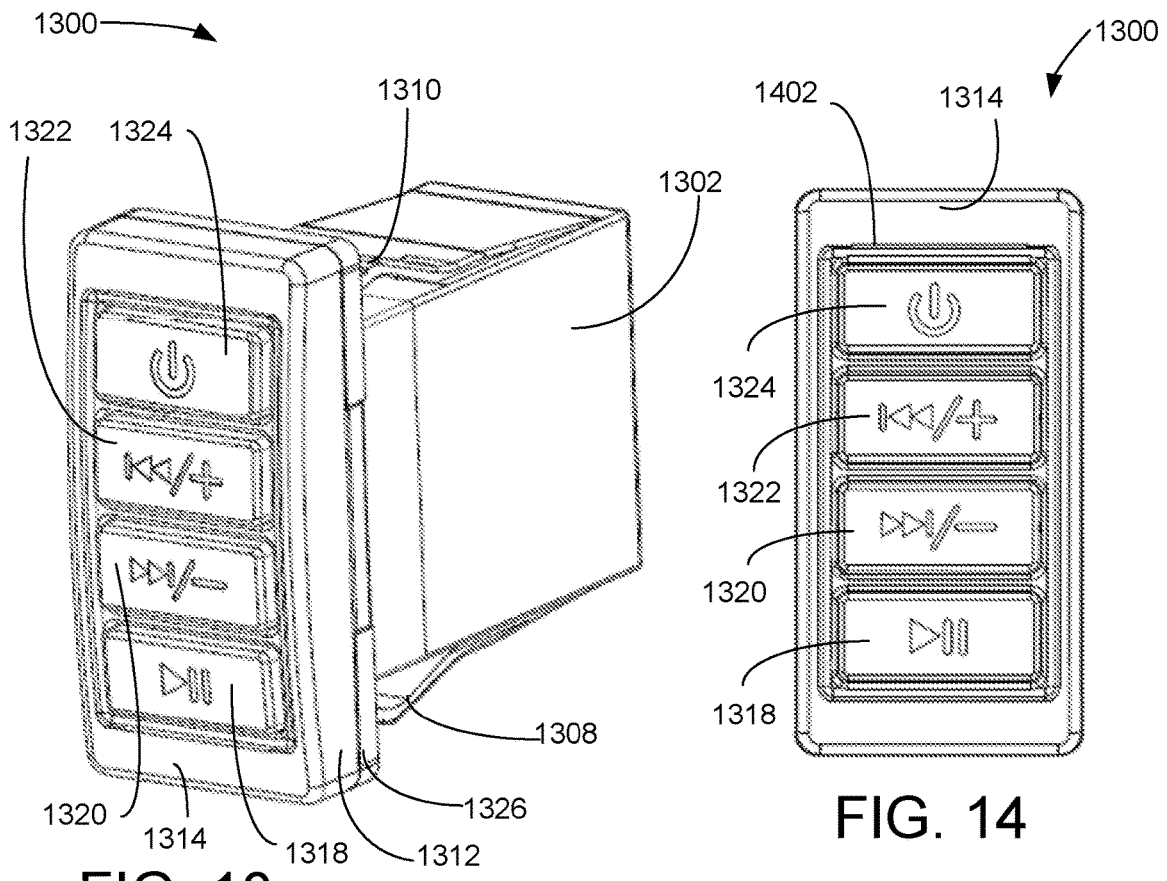
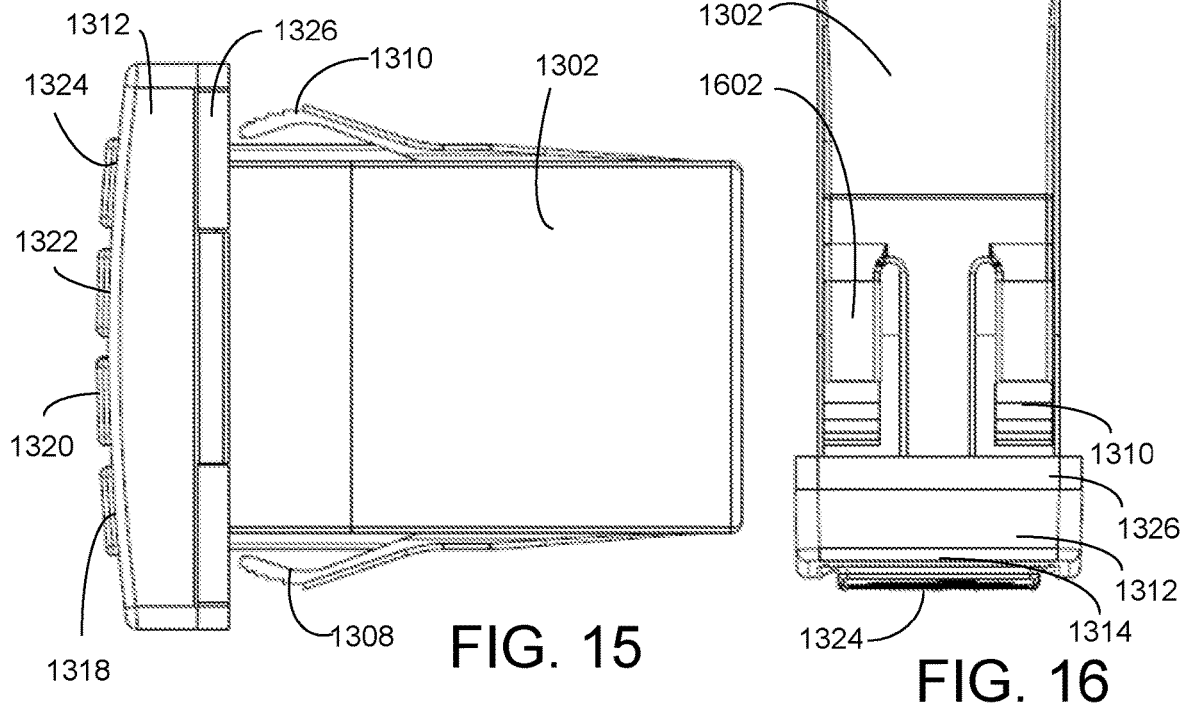

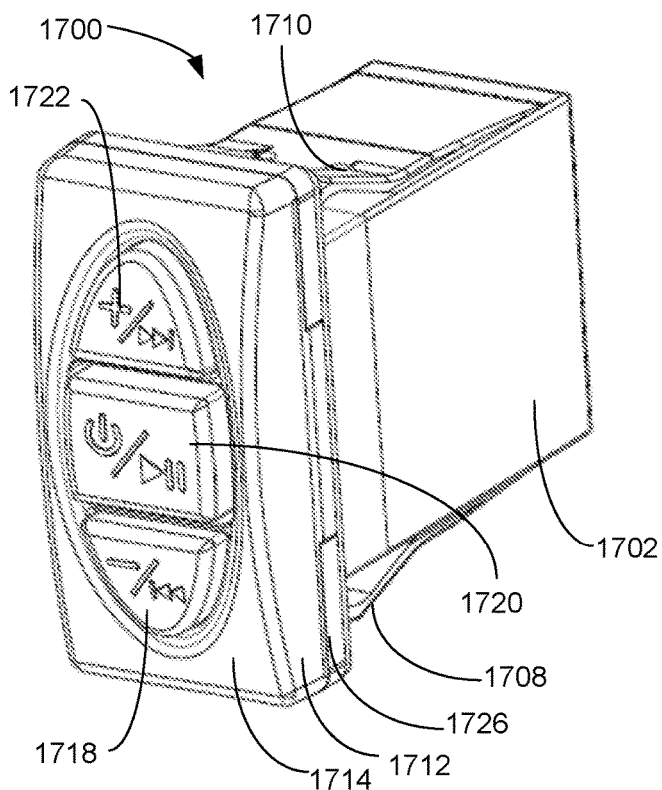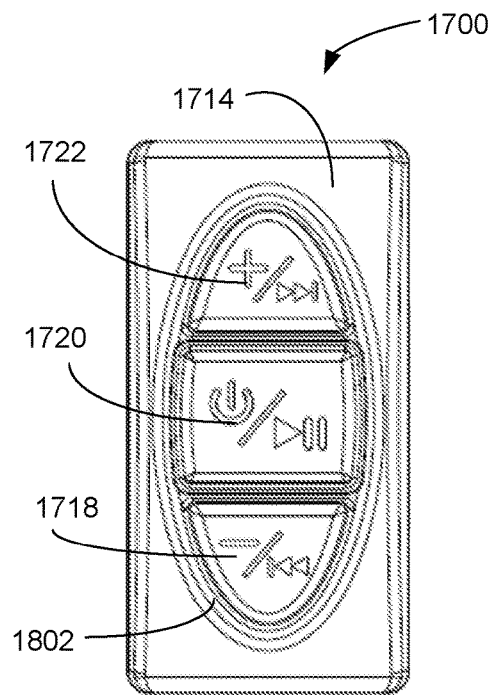
FIG. 17
FIG. 18
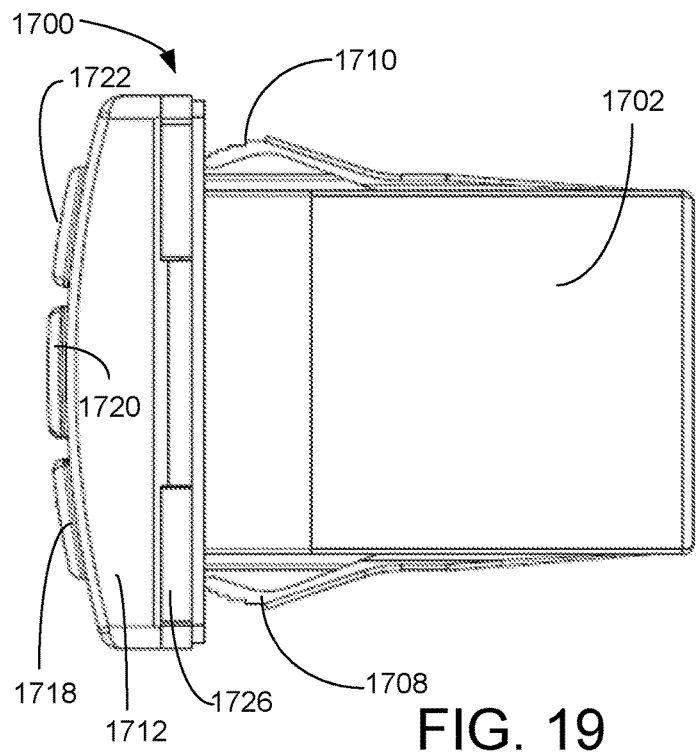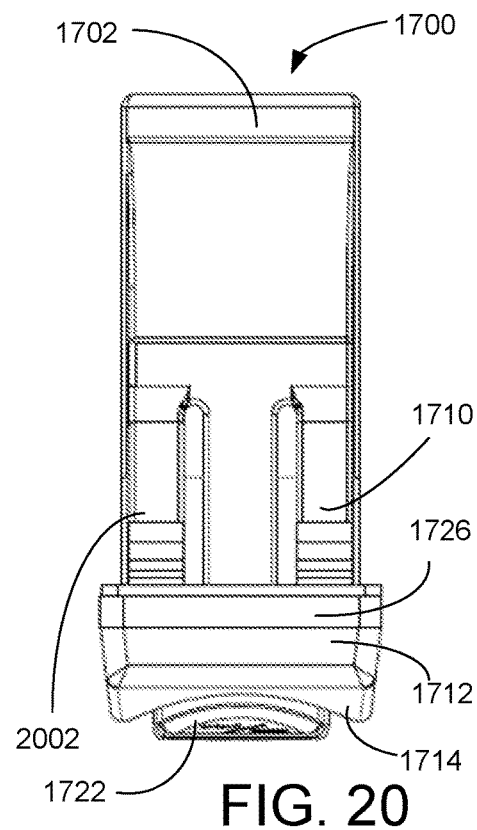
FIG. 19
FIG. 20

MODULAR ENTERTAINMENT CONTROL SYSTEM OF SNAP-MOUNTED MULTI-FUNCTIONAL MODULES WITHIN A MODULAR MOUNTING FRAME

FIELD OF ART

The present invention relates to compact manually actuated modular controls of the push-button and knob types designed for installation in a rocker switch mounting frame. The present invention more particularly relates to a set of such modular controls that can be used together to control audio systems and associated red-green-blue (RGB) light emitting diode (LED) lighting systems.

BACKGROUND OF THE INVENTION

Rocker switches are made to be snap mounted into industry-standardized rocker switch frames. Conventional frame-mounted rocker switch installations provide limited control options as each rocker switch has only two states and one function. The limitation on function creates limitations as to what may be controlled. The need for compactness, especially in vehicular installations, drives a need for expanded capability for switches in rocker switch frames. What is needed are modular audio and lighting elements with multiple functions that can be easily snap-in mounted in a rocker switch frame. Also needed is a modular rocker switch frame that can be assembled to have two or more ports.

SUMMARY OF THE INVENTION

Briefly described, the invention includes a set of eight compact multi-state modular audio devices and lighting controls that can be snap-in mounted in a rocker switch frame, including multi-port rocker switch frames. Rocker switch frames may have any number of ports for snap in mounting and a modular rocker switch frame that can have two or more ports is provided.

DESCRIPTION OF THE FIGURES OF THE DRAWINGS

The present invention will hereinafter be described in conjunction with the following drawing figures, wherein like numerals denote like elements.

FIG. 5 is a front perspective view illustrating a second exemplary embodiment of a compact modular element of the modular entertainment control system, according to a preferred embodiment of the present invention;

FIG. 6 is a front elevation view illustrating the exemplary second embodiment of the compact modular element of the modular entertainment control system of FIG. 5, according to a preferred embodiment of the present invention;

FIG. 7 is a side elevation view illustrating the exemplary second embodiment of the compact modular element of the modular entertainment control system of FIG. 5, according to a preferred embodiment of the present invention;

FIG. 8 is a top plan view illustrating the exemplary second embodiment of the compact modular element of the modular entertainment control system of FIG. 5, according to a preferred embodiment of the present invention;

FIG. 13 is a front perspective view illustrating an exemplary fourth embodiment of the compact modular element of the modular entertainment control system, according to a preferred embodiment of the present invention;

FIG. 14 is a front elevation view illustrating the exemplary fourth embodiment of the compact modular element of the modular entertainment control system of FIG. 13, according to a preferred embodiment of the present invention;

FIG. 15 is a side elevation view illustrating the exemplary fourth embodiment of the compact modular element of the modular entertainment control system of FIG. 13, according to a preferred embodiment of the present invention;

FIG. 16 is a top plan view illustrating the exemplary fourth embodiment of the compact modular element of the modular entertainment control system of FIG. 13, according to a preferred embodiment of the present invention;

FIG. 17 is a front perspective view illustrating an exemplary fifth embodiment of a compact modular element of the modular entertainment control system, according to a preferred embodiment of the present invention;

FIG. 18 is a front elevation view illustrating the exemplary fifth embodiment of the compact modular element of the modular entertainment control system of FIG. 17, according to a preferred embodiment of the present invention;

FIG. 19 is a side elevation view illustrating the exemplary fifth embodiment of the compact modular element of the modular entertainment control system of FIG. 17, according to a preferred embodiment of the present invention;

FIG. 20 is a top plan view illustrating the exemplary fifth embodiment of the compact modular element of the modular entertainment control system of FIG. 17, according to a preferred embodiment of the present invention;

DETAILED DESCRIPTION OF THE INVENTION

Reference numbers herein conventionally show, in the hundreds digits, the figure number in which the referenced item was first identified for discussion. An effort was made, were possible, to give similar items similar numbers in the tens and ones digits of reference numbers.

Figure 1:
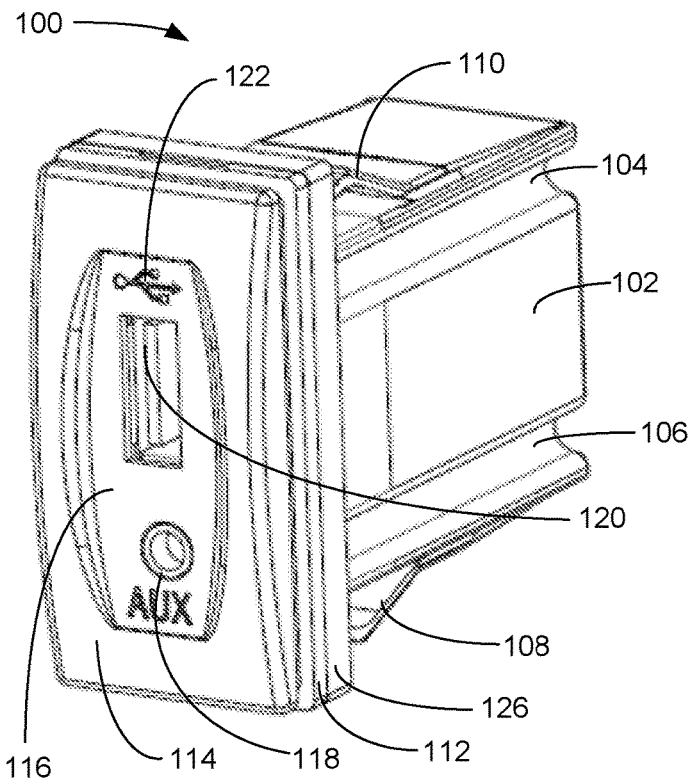
FIG. 1 is a front perspective view illustrating an exemplary embodiment of a compact modular element of the modular entertainment control system, according to a preferred embodiment of the present invention.

FIG. 1 is a front perspective view illustrating an exemplary embodiment of a compact modular element 100 of the modular entertainment control system 3600 (see FIG. 36), according to a preferred embodiment of the present invention. Compact modular element 100 is a charger for other electronic devices via a USB port 120 with a 12-24 volts direct current (VDC). It also provides an auxiliary audio input via the auxiliary port 118. When the auxiliary input port 118 is in use, a remote turn on wire turns on an amplifier to which the auxiliary input signal is sent. Both the USB port 120 and the auxiliary input jack 118 are usually found on the back of head units. An advantage of this invention is that it provides these connections on the dashboard side of a head unit. Compact modular element 100 includes a housing 102, a front panel support 126, and a convex outer front panel 114, as shown. Housing 102 has optional alignment grooves 104 and 106 and supports top and bottom ratchet latches 110 and 108, respectively. Slightly arcuate outer front panel 114 has a recessed flat panel 116 supporting the USB port 120 and an auxiliary audio input jack 118. USB port 120 is labeled with the conventional USB symbol 122. USB port 120 supplies power to USB chargeable devices, such as smart phones. Housing 102 holds the associated electronics, particularly the USB port 120 and the auxiliary audio input jack 118, and connectivity is provided off the back plane (not shown) of the housing 102.

Figure 2:
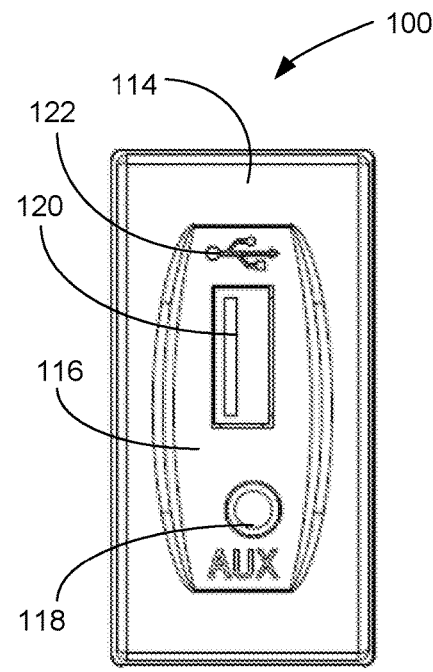
FIG. 2 is a front elevation view illustrating the exemplary embodiment of the compact modular element of the modular entertainment control system of FIG. 1, according to a preferred embodiment of the present invention.

FIG. 2 is a front elevation view illustrating the exemplary embodiment of the compact modular element 100 of the modular entertainment control system 3600 of FIG. 1, according to a preferred embodiment of the present invention. The arcuate side boundaries of the recessed flat panel 116 can be more clearly seen. Compact modular element 100 is preferably made of marine grade materials that are UV resistant and preferably has a tethered water resistant cover (not shown) to close off USB port 120 and auxiliary audio input jack 118 when not in use. The modular entertainment control system 3600 is useful in marine, air, and land vehicles.

Figure 3:
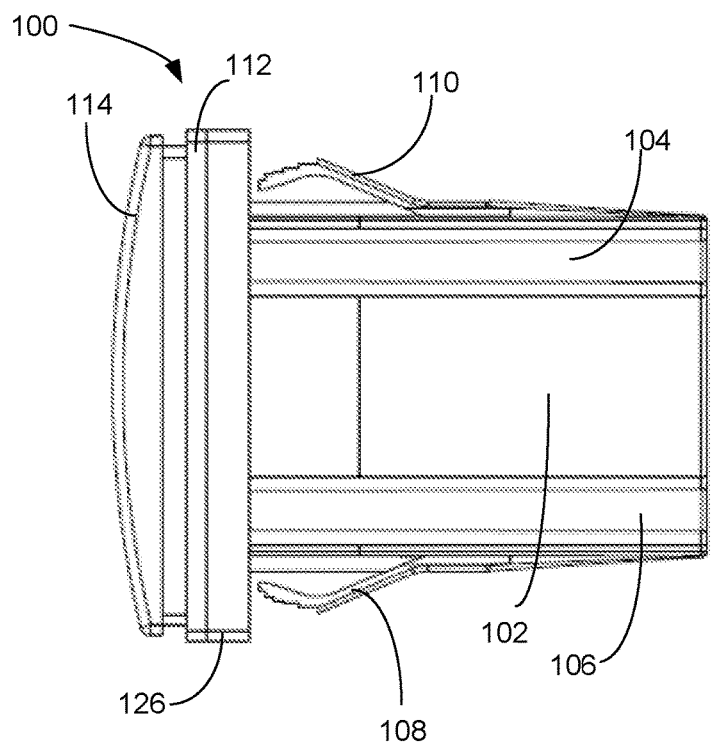
FIG. 3 is a side elevation view illustrating the exemplary embodiment of the compact modular element of the modular entertainment control system of FIG. 1, according to a preferred embodiment of the present invention.

FIG. 3 is a side elevation view illustrating the exemplary embodiment of the compact modular element 100 of the modular entertainment control system 3600 of FIG. 1, according to a preferred embodiment of the present invention. Front panel support 126 is preferably of one piece with housing 102 and is fixed to edges of front panel side 112. Front panel 114 covers supports for the internal electronics and, during assembly, is snap-fitted onto the front of the housing 102. Additional support for the internal electronics may be provided inside the housing 102.

Figure 4:
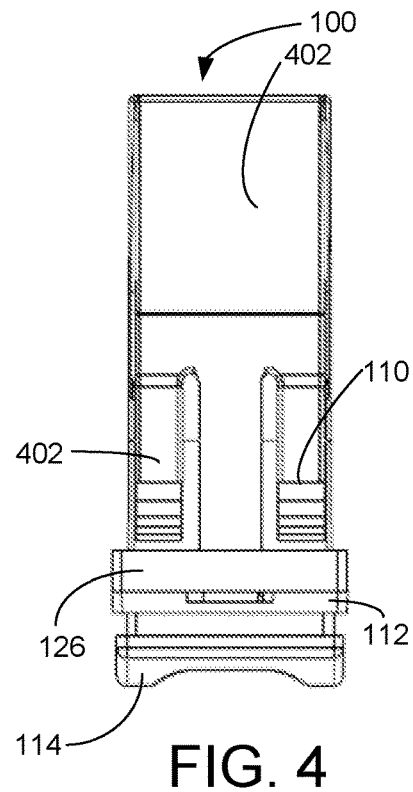
FIG. 4 is a top plan view illustrating the exemplary embodiment of the compact modular element of the modular entertainment control system of FIG. 1, according to a preferred embodiment of the present invention.

FIG. 4 is a top plan view illustrating the exemplary embodiment of the compact modular element 100 of the modular entertainment control system 3600 of FIG. 1, according to a preferred embodiment of the present invention. The top of housing 102 supports two ratchet latches 110 and 402, and this is mirrored on the bottom of housing 102. Ratchet latches 110 and 402 include reed springs attached to or of one piece with the ratchet head. The ratchet latches 110 and 402 allow the compact modular element 100 to be snap-fitted into a modular support panel 3300, 3400, and 3502 (see FIGS. 33-35). In other embodiments, other support panels may be used.

FIG. 5 is a front perspective view illustrating a second exemplary embodiment of a compact modular element 500 of the modular entertainment control system 3600, according to a preferred embodiment of the present invention. Compact modular element 500 is a USB charger using the USB port 520 that has a 12-24 VDC input (via the back plane) and an audio auxiliary input jack 518. When the auxiliary input port 504 is in use, a remote turn on wire turns on an amplifier to which the auxiliary input signal is sent. Electronic display 524 is preferably a threes element electronic display screen 524 portion of an internal voltmeter. The voltmeter includes a display driver. Compact modular element 500 includes a housing 502, a front panel support 526, a deep front panel side 512 and a convex outer front panel 514, as shown. Housing 502 supports top and bottom ratchet latches 510 and 508, respectively. Slightly convex front panel 514 has a first recessed flat panel 518 supporting a USB port 520 and a second recessed flat panel 516 supporting an auxiliary audio input jack 504. USB port 520 is labeled with the conventional USB symbol 522. USB port 520 supplies power to various electronic devices, such as smart phones. The flat panel three-element voltmeter display 524 is positioned between first and second recessed flat panels 518 and 516, respectively. The voltmeter that runs the display 524 is part of the internal electronics within housing 502. Housing 502 encloses the associated electronics for the USB port 520, the display screen 524 (including the display screen driver), and the auxiliary audio input jack 504 as well, and connectivity to power is provided off the back plane (not shown) of the housing 502.

FIG. 6 is a front elevation view illustrating the exemplary second embodiment of the compact modular element 500 of the modular entertainment control system 3600 of FIG. 5, according to a preferred embodiment of the present invention. The side boundaries of the recessed flat panels 518 and 516 can be more clearly seen. Compact modular element 500 is preferably made of marine grade materials that are UV resistant and preferably has a tethered water resistant cover (not shown) to close off USB port 520 and auxiliary port 504 when not in use.

FIG. 7 is a side elevation view illustrating the exemplary second embodiment of the compact modular element 500 of the modular entertainment control system 3600 of FIG. 5, according to a preferred embodiment of the present invention. Front panel support 526 is preferably of one piece with housing 502 and is fixed to edges of deep front panel side 512. Front panel 514 covers supports for the internal electronics and, during assembly, is snap-fitted onto the front of the housing 502. Additional support for the internal electronics may be provided inside the housing 502.

FIG. 8 is a top plan view illustrating the exemplary second embodiment of the compact modular element 500 of the modular entertainment control system 3600 of FIG. 5, according to a preferred embodiment of the present invention. The top of housing 502 supports two ratchet latches 510 and 802, and this is mirrored on the bottom of housing 502. Ratchet latches 510 and 802 include reed springs attached to or of one piece with the ratchet head. The ratchet latches 510 and 802 allow the compact modular element 500 to be snap fit into a modular support panel 3300, 3400, and 3502 (see FIGS. 33-35).

Figure 9:
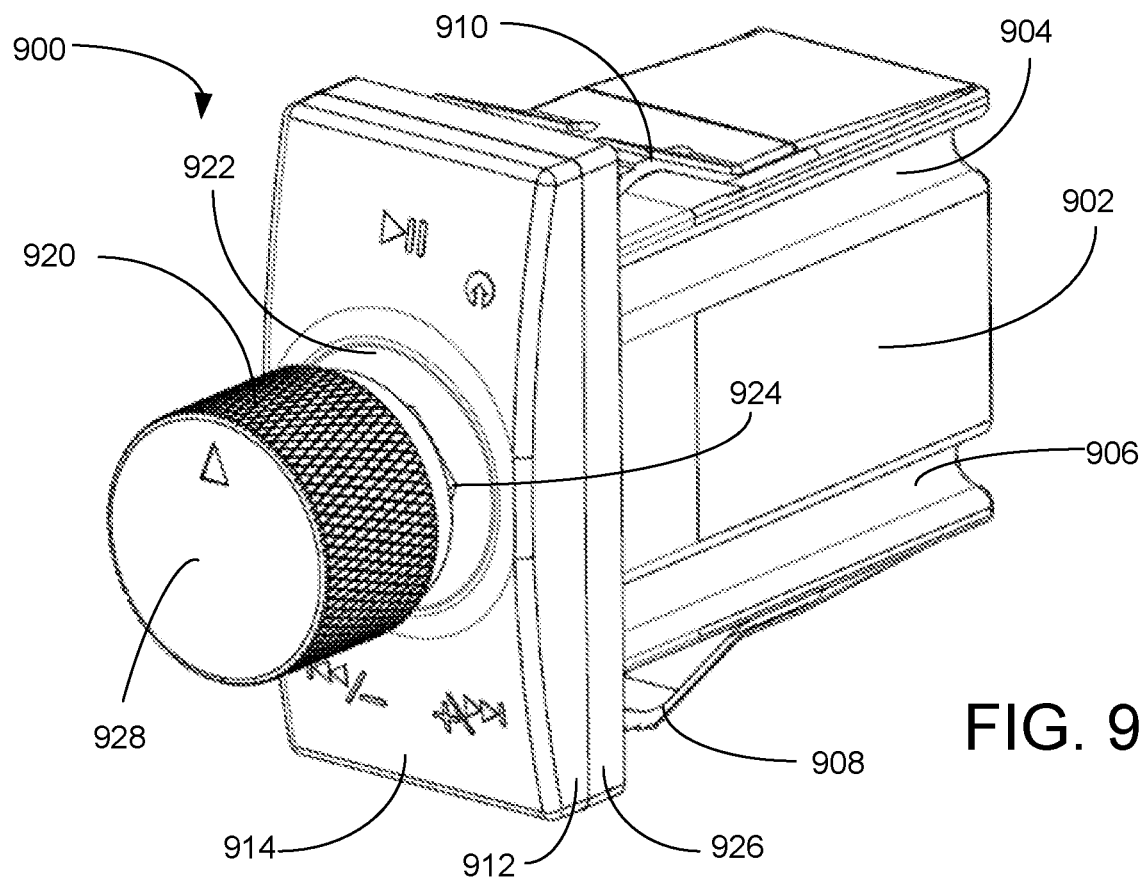
FIG. 9 is a front perspective view illustrating an exemplary third embodiment of the compact modular element of the modular entertainment control system, according to a preferred embodiment of the present invention.

FIG. 9 is a front perspective view illustrating an exemplary third embodiment of the compact modular element 900 of the modular entertainment control system 3600, according to a preferred embodiment of the present invention. Compact modular element 900 is preferably a modified compact single knob controller of U.S. Pat. No. 9,595,402 to the same inventors. It has been modified to fit housing 902. Compact modular element 900 includes switching logic. Compact modular element 900 includes a housing 902, a front panel support 926, a deeper front panel side 912 and a convex outer front panel 914, as shown. Housing 902 supports top and bottom ratchet latches 910 and 908, respectively. Slightly outer convex front panel 914 has an annular raised flat panel 922 supporting a multi-functional knob 928 secured to annular raised flat panel 922 with a nut 924. Multi-functional knob 928 preferably has a textured surface 920 for improved tactile interaction. Housing 902 holds the adapted compact associated electronics for the signal knob controller system, or other knob 928 controlled system, and connectivity to all is provided off the back plane (not shown) of the housing 902.

Figure 10:
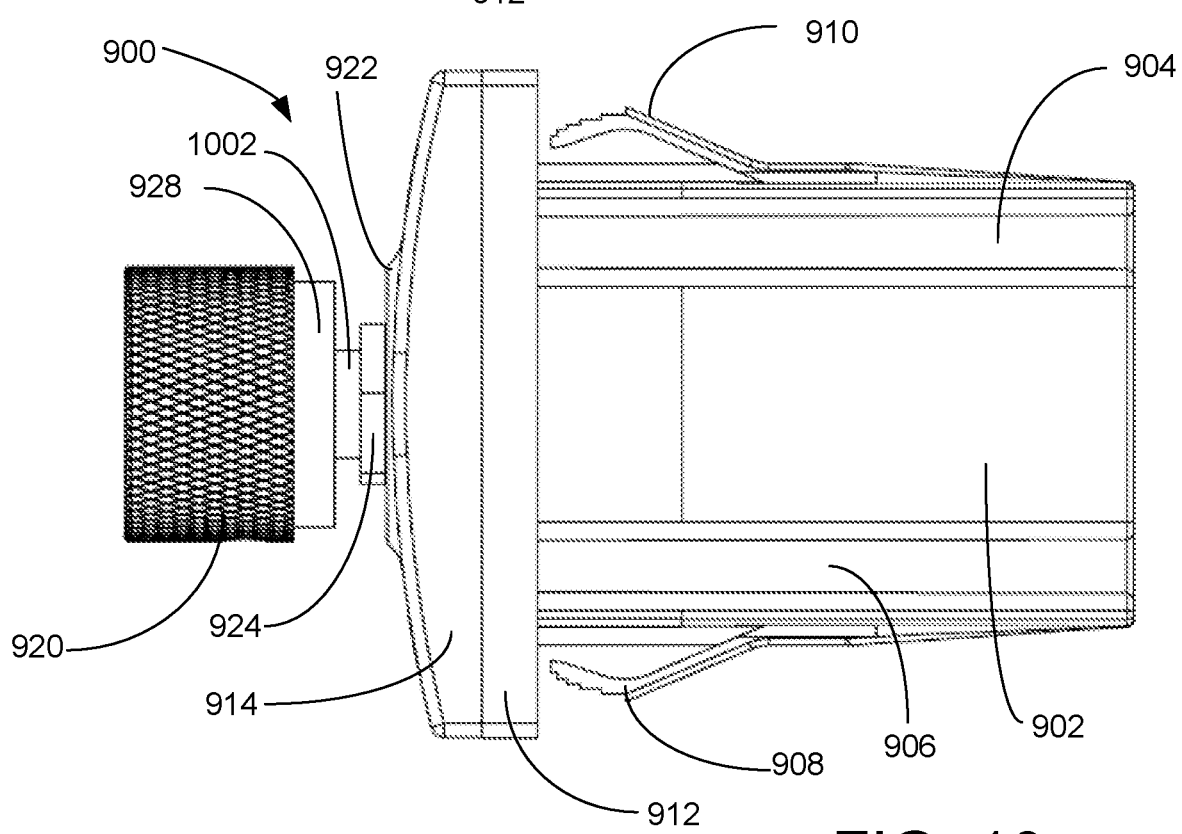
FIG. 10 is a side elevation view illustrating the exemplary third embodiment of the compact modular element of the modular entertainment control system of FIG. 9, according to a preferred embodiment of the present invention.

FIG. 10 is a side elevation view illustrating the exemplary third embodiment of the compact modular element 900 of the modular entertainment control system 3600 of FIG. 9, according to a preferred embodiment of the present invention. Annular raised flat panel 922 is more easily seen in this view, as is nut 924 surrounding knob axle 1002. Compact modular element 900 is preferably made of marine grade materials that are UV resistant.

Figure 11:
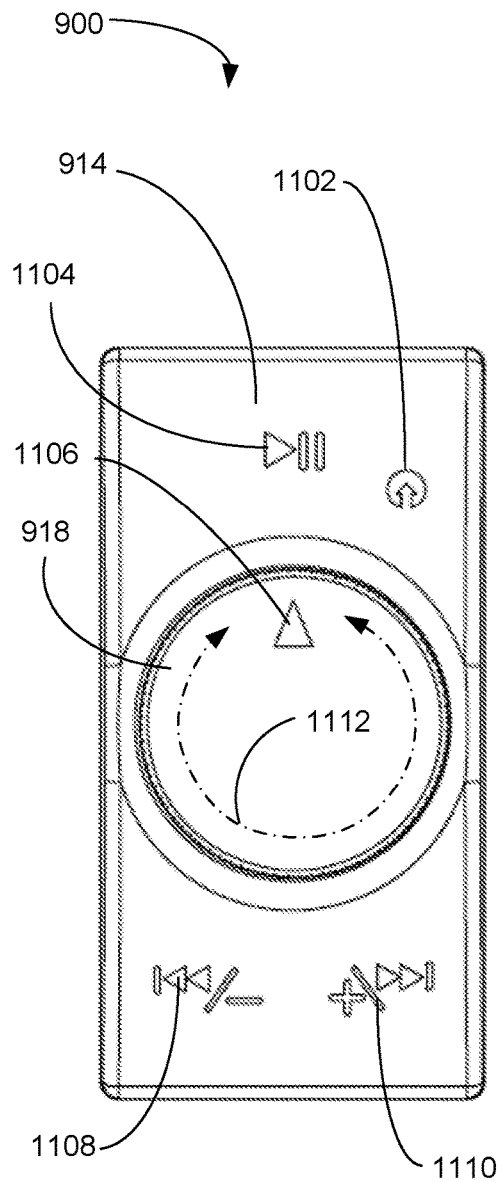
FIG. 11 is a front elevation view illustrating the exemplary third embodiment of the compact modular element of the modular entertainment control system of FIG. 9, according to a preferred embodiment of the present invention.

FIG. 11 is a front elevation view illustrating the exemplary third embodiment of the compact modular element 900 of the modular entertainment control system 3600 of FIG. 9, according to a preferred embodiment of the present invention. Knob 918 has an indicator icon 1106 that points to one of icons 1102, 1104, 1108, or 1110 when the knob 918 is appropriately rotated. Play/pause icon 1104 toggles playing and pausing of an audio recording when the knob 918 is positioned as shown and pushed axially inward. Input selection icon 1102 is selected by rotating knob 918 to position knob indicator 1106 pointing toward the input selection icon 1102, where sequential axial pushing of knob 918 cycles through available audio sources. Fast forward/up volume icon 1110 is selected by rotating knob 918 to position knob indicator 1106 pointing toward the fast forward/up volume icon 1110 and pushing the knob 918 inward and holding it to fast forward the audio recording or pushing the knob 918 inward momentarily to increase the volume of the sound from an attached audio system. Fast backward/down volume icon 1108 is selected by rotating knob to position knob indicator 1106 pointing toward the fast backward/down volume icon 1108 and pushing the knob 918 inward and holding it to fast reverse the audio recording or pushing the knob 918 inward momentarily to decrease the volume of the sound from an attached audio system. In other embodiments, other icons may be used and/or other functions supported. Mechanically, knob 918 operates an actuator that has a rotational motion 1112 part and an axial motion 1204 part (see FIG. 12). In a particular preferred embodiment, the knob 918 moves both rotationally 1112 and axially 1204 to provide up to seventeen outputs as the axial motion 1204 has separate functions depending on whether the axial motion 1204 is momentary or continuous.

Figure 12:
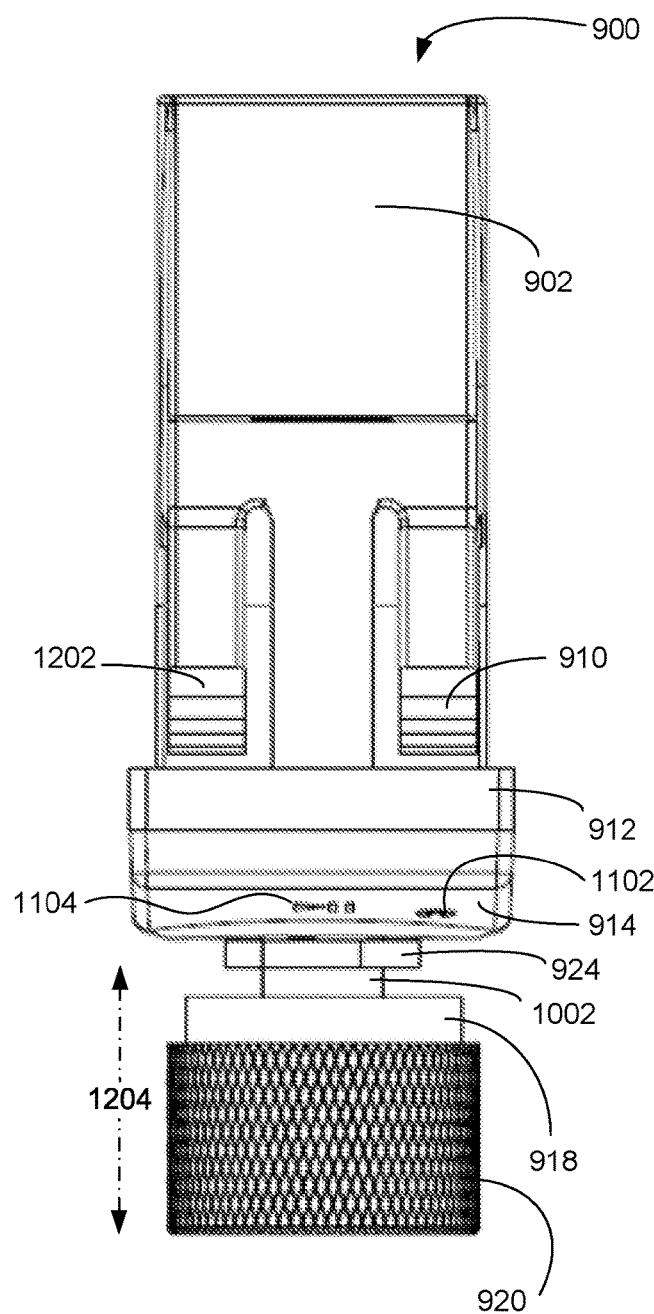
FIG. 12 is a top plan view illustrating the exemplary third embodiment of the compact modular element of the modular entertainment control system of FIG. 9, according to a preferred embodiment of the present invention.

FIG. 12 is a top plan view illustrating the exemplary third embodiment of the compact modular element 900 of the modular entertainment control system 3600 of FIG. 9, according to a preferred embodiment of the present invention. The top of housing 902 supports two ratchet latches 910 and 1202, and this is mirrored on the bottom of housing 902. Ratchet latches 910 and 1202 include reed springs attached to or of one piece with the ratchet head. The ratchet latches 901 and 1202 allow the compact modular element 900 to be snap-fitted into a modular support panel 3300, 3400, and 3502 (see FIGS. 33-35). Axial motion 1204 of the knob 918 enables additional functions.

FIG. 13 is a front perspective view illustrating an exemplary fourth embodiment of the compact modular element 1300 of the modular entertainment control system 3600, according to a preferred embodiment of the present invention. Compact modular element 1300 is an audio controller 1300. Compact modular element 1300 includes a housing 1302, a front panel support 1326, and a convex front panel 1314 with wide sides 1312, as shown. Housing 902 supports top and bottom ratchet latches 1310 and 1308, respectively. Slightly arcuate front panel 1314 has four push button controls mounted there on. The top button 1324 is a power button 1324 for turning the audio controller 1300 ON or OFF. The second button 1322 functions as a fast reverse/up volume button 1322. By momentarily depressing fast reverse/up volume button 1322 fast reverse is toggled ON or OFF. By depressing and holding fast reverse/up volume button 1322, audio volume is increased. The third button 1320 functions as fast forward/down volume button 1320. By momentarily depressing fast forward/down volume button 1320 fast forward is toggled ON or OFF. By depressing and holding fast forward/down volume button 1320, audio volume is decreased. The bottom button 1318 is a play/pause toggle button 1318. Housing 1302 and front panel 1314 hold the associated electronics, including switching logic, and connectivity is provided off the back plane (not shown) of the housing 1302. The wide sides 1312 have internal features that support the buttons 1318, 1320, 1322, and 1324.

FIG. 14 is a front elevation view illustrating the exemplary fourth embodiment of the compact modular element 1300 of the modular entertainment control system 3600 of FIG. 13, according to a preferred embodiment of the present invention. Preferably, the four buttons 1318, 1320, 1322, and 1324 are within a recess 1402 in front panel 1314.

FIG. 15 is a side elevation view illustrating the exemplary fourth embodiment of the compact modular element 1300 of the modular entertainment control system 3600 of FIG. 13, according to a preferred embodiment of the present invention. Front panel support 1326 is preferably of one piece with housing 1302. Front panel 1314 covers supports for the internal electronics and, during assembly, is snap-fitted onto the front of the housing 1302. Additional support for the internal electronics may be provided inside the housing 1302.

FIG. 16 is a top plan view illustrating the exemplary fourth embodiment of the compact modular element 1300 of the modular entertainment control system 3600 of FIG. 13, according to a preferred embodiment of the present invention. The top of housing 1302 supports two ratchet latches 1310 and 1602, and this is mirrored on the bottom of housing 1302. Ratchet latches 1310 and 1602 include reed springs attached to, or of one piece with, the ratchet head. The ratchet latches 1310 and 1602 allow the compact modular element 1300 to be snap-fitted into a modular support panel 3300, 3400, and 3502 (see FIGS. 33-35).

FIG. 17 is a front perspective view illustrating an exemplary fifth embodiment of a compact modular element 1700 of the modular entertainment control system 3600, according to a preferred embodiment of the present invention. Compact modular element 1700 is an audio controller 1700. Compact modular element 1700 includes a housing 1702, a front panel support 1726, and a convex front panel 1714 with wide sides 1712, as shown. Housing 1702 supports top and bottom ratchet latches 1710 and 1708, respectively. Slightly arcuate outer front panel 1714 has three push button controls mounted there on. The top button 1722 is a fast forward/up volume button 1722 that increases the volume of the audio output if held down continuously and toggles fast forward if pushed and quickly released. The middle button 1720 is a power ON/OFF and play/pause rocker switch 1720. Momentarily pressing the left side of the switch 1720 toggles power ON or OFF and momentarily depressing the right side of the switch 1720 toggles between play and pause. Fast reverse/down volume button 1718 decreases the volume of the audio output if held down continuously and toggles fast reverse if pushed and quickly released. Outer front panel 1714 covers supports for the internal electronics, including switching logic and, during assembly, is snap-fitted onto the front of the housing 1702. Connectivity is provided off the back plane (not shown) of the housing 1702. The wide sides 1712 have internal features that support the buttons 1718, 1720, and 1722.

FIG. 18 is a front elevation view illustrating the exemplary fifth embodiment of the compact modular element 1700 of the modular entertainment control system 3600 of FIG. 17, according to a preferred embodiment of the present invention. Preferably, a socket 1802 surrounds the three buttons 1318, 1320, and 1322.

FIG. 19 is a side elevation view illustrating the exemplary fifth embodiment of the compact modular element 1700 of the modular entertainment control system 3600 of FIG. 17, according to a preferred embodiment of the present invention. Front panel support 1726 is preferably of one piece with housing 1702. Outer Front panel 1714 covers supports for the internal electronics and, during assembly, is snap-fitted onto the front of the housing 1702. Additional support for the internal electronics may be provided inside the housing 1702.

FIG. 20 is a top plan view illustrating the exemplary fifth embodiment of the compact modular element 1700 of the modular entertainment control system 3600 of FIG. 17, according to a preferred embodiment of the present invention. The top of housing 1702 supports two ratchet latches 1710 and 2002, and this is mirrored on the bottom of housing 1702. Ratchet latches 1710 and 2002 include reed springs attached to, or of one piece with, the ratchet head. The ratchet latches 1710 and 2002 allow the compact modular element 1700 to be snap fit into a modular support panel 3300, 3400, and 3502 (see FIGS. 33-35).

Figure 21:
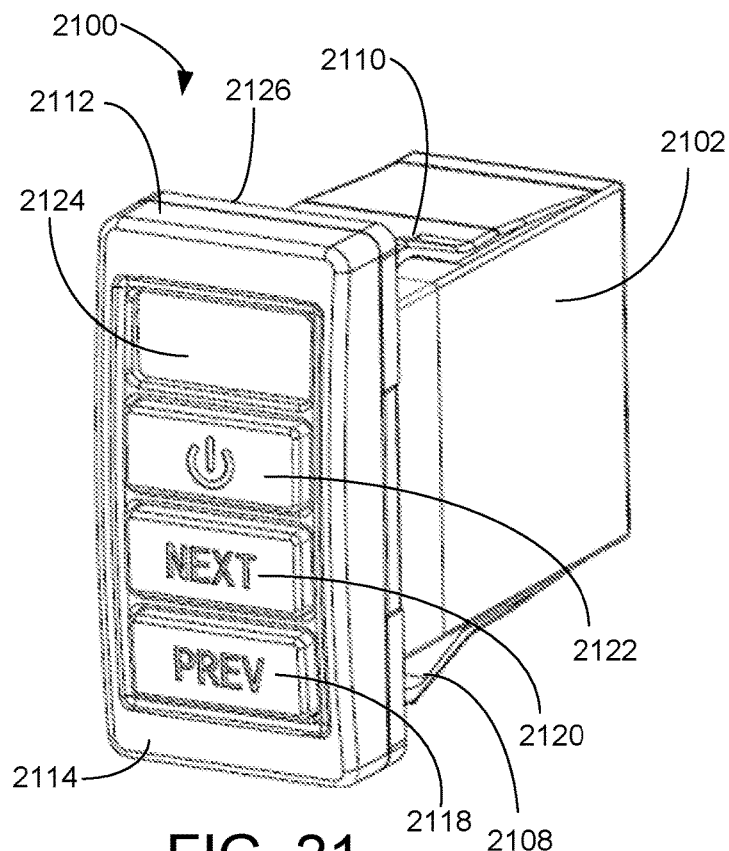
FIG. 21 is a front perspective view illustrating an exemplary sixth embodiment of a compact modular element of the modular entertainment control system, according to a preferred embodiment of the present invention.

FIG. 21 is a front perspective view illustrating an exemplary sixth embodiment of a compact modular element 2100 of the modular entertainment control system 3600, according to a preferred embodiment of the present invention. Compact modular element 2100 is an FM radio receiver 2100 with a three-element electronic FM channel display 2124. Compact modular element 2100 includes a housing 2102, a front panel support 2126, and a convex front panel 2114 with wide sides 2112, as shown. Housing 2102 supports top and bottom ratchet latches 2110 and 2108, respectively. Slightly arcuate front panel 2114 has three push button controls 2118, 2120, and 2122 as well as one display window 2124 mounted there on. The top button 2122 is a power ON/OFF button 2122. The middle button 2120 is used to scan for the next available FM channel and locks onto it when found. Bottom button 2118 scans for the previous available FM channel and locks onto it when found. Display 2124 shows the FM radio channel number of the selected FM radio channel. Housing 2102 and front panel 2114 hold the associated electronics, including switching logic, and connectivity is provided off the back plane (not shown) of the housing 2102. The wide sides 2112 have internal features that support the buttons 2118, 2120, and 2122 as well as display 2124.

Figure 22:
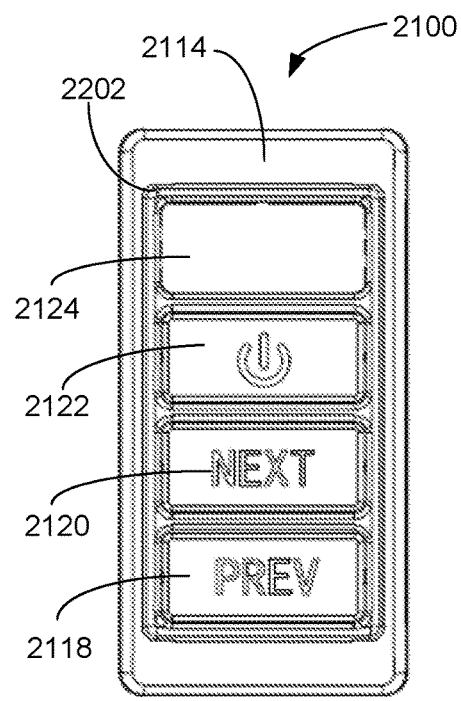
FIG. 22 is a front elevation view illustrating the exemplary sixth embodiment of the compact modular element of the modular entertainment control system of FIG. 21, according to a preferred embodiment of the present invention.

FIG. 22 is a front elevation view illustrating the exemplary sixth embodiment of the compact modular element 2100 of the modular entertainment control system 3600 of FIG. 21, according to a preferred embodiment of the present invention. Preferably, a socket 2202 surrounds the three buttons 2118, 2120, and 2122 as well as the display 2124.

Figure 23:
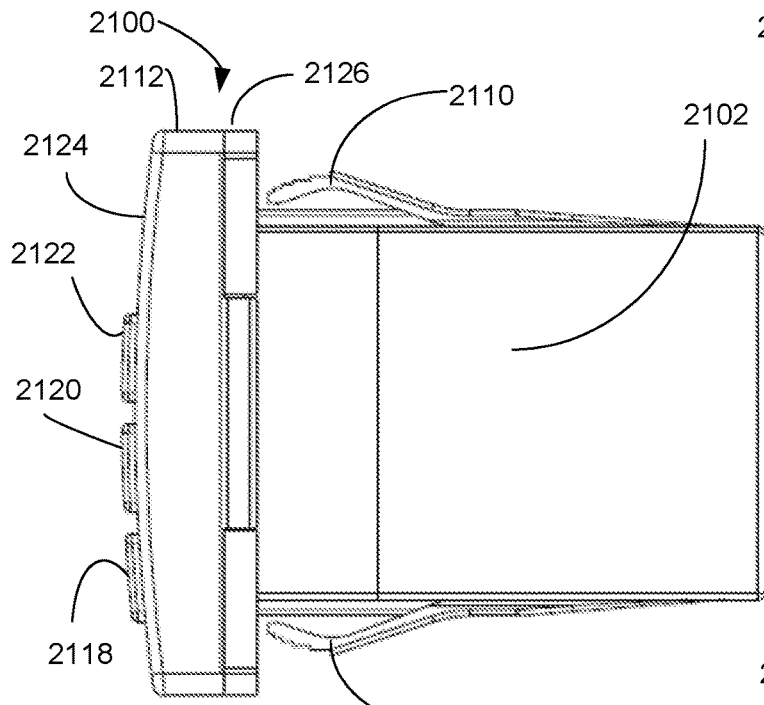
FIG. 23 is a side elevation view illustrating the exemplary sixth embodiment of the compact modular element of the modular entertainment control system of FIG. 21, according to a preferred embodiment of the present invention.

FIG. 23 is a side elevation view illustrating the exemplary sixth embodiment of the compact modular element 2100 of the modular entertainment control system 3600 of FIG. 21, according to a preferred embodiment of the present invention. Front panel support 2126 is preferably of one piece with housing 2102. Outer front panel 2114 covers supports for the internal electronics and, during assembly, is snap-fitted onto the front of the housing 2102.

Additional support for the internal electronics may be provided inside the housing 2102.

Figure 24:
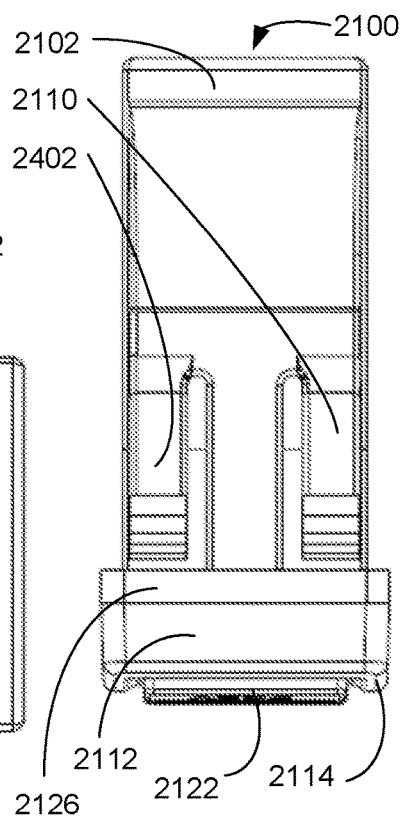
FIG. 24 is a top plan view illustrating the exemplary sixth embodiment of the compact modular element of the modular entertainment control system of FIG. 21, according to a preferred embodiment of the present invention.

FIG. 24 is a top plan view illustrating the exemplary sixth embodiment of the compact modular element 2100 of the modular entertainment control system 3600 of FIG. 21, according to a preferred embodiment of the present invention. The top of housing 2102 supports two ratchet latches 2110 and 2402, and this is mirrored on the bottom of housing 2102. Ratchet latches 2110 and 2402 include reed springs attached to, or of one piece with, the ratchet head. The ratchet latches 2110 and 2402 allow the compact modular element 2100 to be snap-fitted into a modular support panel 3300, 3400, and 3502 (see FIGS. 33-35).

Figure 25:
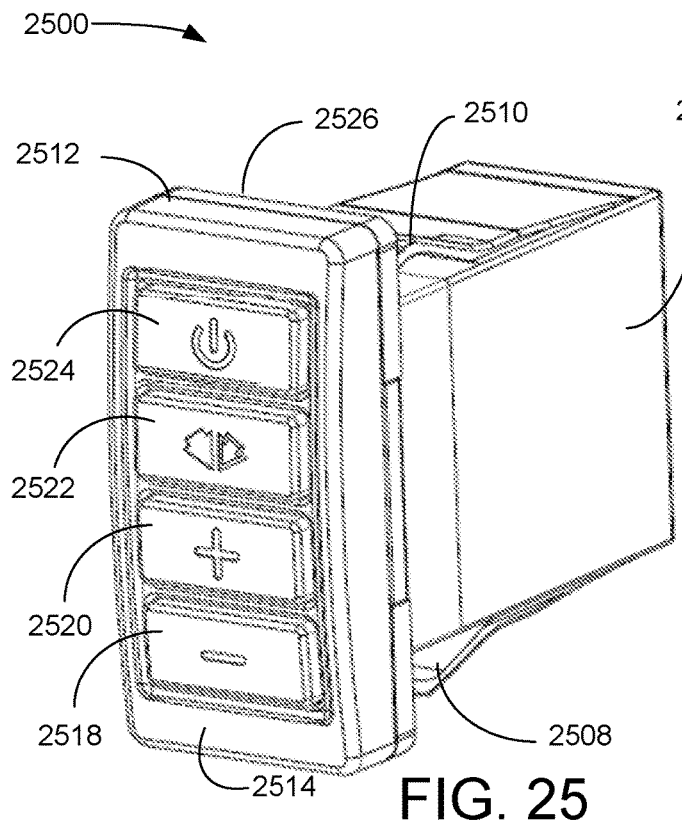
FIG. 25 is a front perspective view illustrating an exemplary seventh embodiment of a compact modular element of the modular entertainment control system, according to a preferred embodiment of the present invention.

FIG. 25 is a front perspective view illustrating an exemplary seventh embodiment of a compact modular element 2500 of the modular entertainment control system 3600, according to a preferred embodiment of the present invention. Compact modular element 2500 is preferably a wireless music sharing element 2500 that may receive audio signals via a 3.5 millimeter (mm) audio jack on the back plane (not shown) and shares the audio wirelessly with up to four receivers within fifty meters. For non-limiting example, the wired input may be from FM receiver 2100. Wireless music sharing element 2500 may be either the source of the shared audio or may act as a receiver for a second wireless music sharing element 2500, perhaps in another vehicle. The radio frequency (RF) for transmitting and receiving is 2.4 gigahertz (GHz). Compact modular element 2500 includes a housing 2502, a front panel support 2526, and a convex front panel 2514 with wide sides 2512, as shown. Housing 2502 supports top and bottom ratchet latches 2510 and 2508, respectively. Slightly arcuate outer front panel 2514 has four push button controls 2518, 2520, 2522, and 2524 mounted there on. The top button 2524 is a power ON/OFF button 2524. The second button 2524 is a pairing button 2524 which, when depressed, signals availability to nearby connectable devices and establishes wireless audio signal communication links to up to four other similarly equipped devices. Third button 2520 is for increasing the audio volume and fourth button 2518 is for reducing the audio volume. Outer front panel 2514 covers supports for the internal electronics, including a Bluetooth® transceiver and switching logic and, during assembly, is snap-fitted onto the front of the housing 2502. Connectivity is provided off the back plane (not shown) of the housing 2502. The wide sides 2512 have internal features that support the buttons 2518, 2520, 2522, and 2524.

Figure 26:
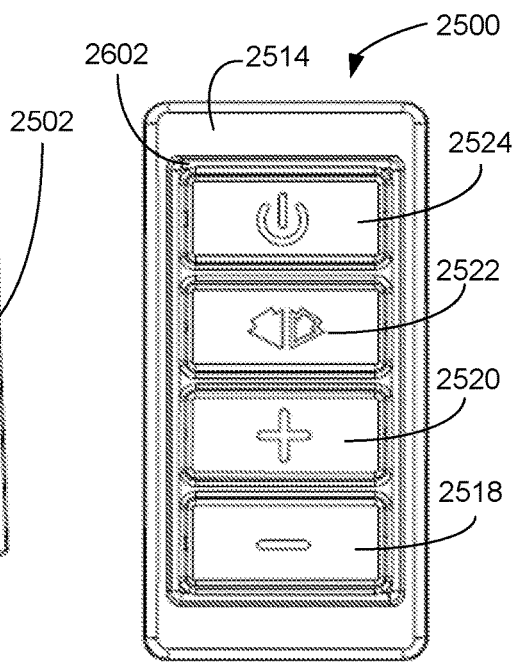
FIG. 26 is a front elevation view illustrating the exemplary seventh embodiment of the compact modular element of the modular entertainment control system of FIG. 25, according to a preferred embodiment of the present invention.

FIG. 26 is a front elevation view illustrating the exemplary seventh embodiment of the compact modular element 2500 of the modular entertainment control system 3600 of FIG. 25, according to a preferred embodiment of the present invention. Preferably, a socket 2602 surrounds the four buttons 2518, 2520, 2522, and 2524.

Figure 27:
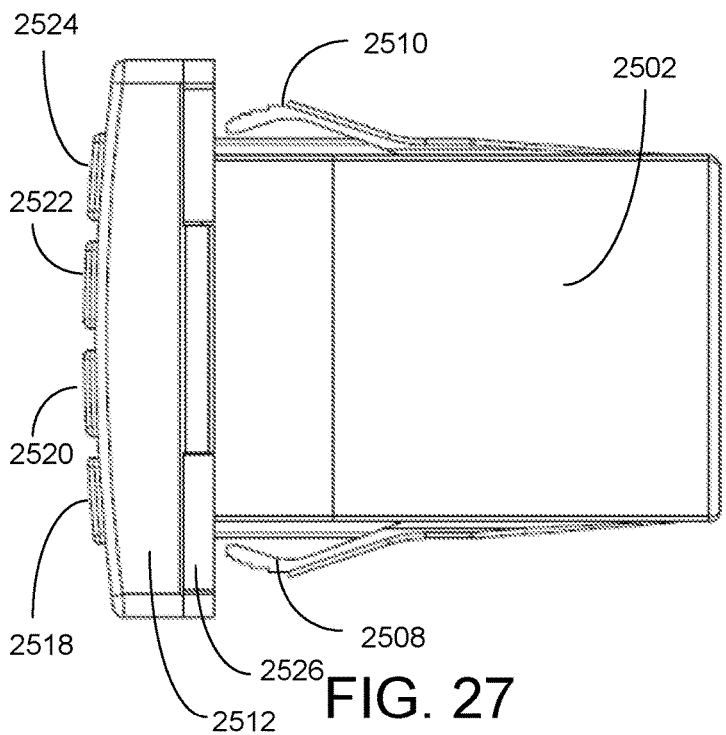
FIG. 27 is a side elevation view illustrating the exemplary seventh embodiment of the compact modular element of the modular entertainment control system of FIG. 25, according to a preferred embodiment of the present invention.

FIG. 27 is a side elevation view illustrating the exemplary seventh embodiment of the compact modular element 2500 of the modular entertainment control system 3600 of FIG. 25, according to a preferred embodiment of the present invention. Front panel support 2526 is preferably of one piece with housing 2502. Outer front panel 2512 covers supports for the internal electronics and, during assembly, is snap-fitted onto the front of the housing 2502. Additional support for the internal electronics may be provided inside the housing 2502.

Figure 28:
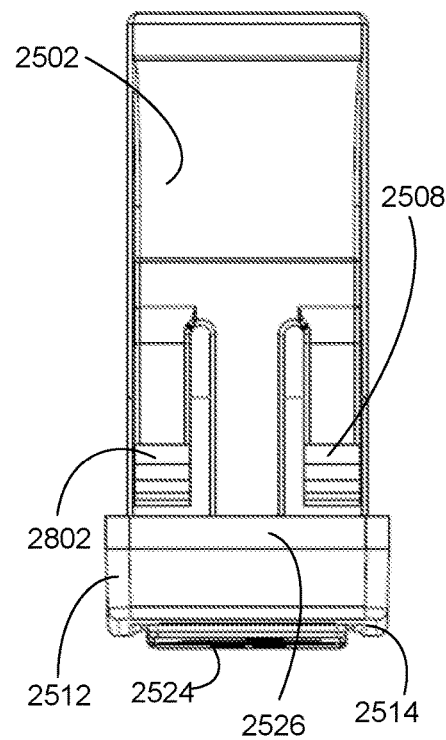
FIG. 28 is a top plan view illustrating the exemplary seventh embodiment of the compact modular element of the modular entertainment control system of FIG. 25, according to a preferred embodiment of the present invention.

FIG. 28 is a top plan view illustrating the exemplary seventh embodiment of the compact modular element 2500 of the modular entertainment control system 3600 of FIG. 25, according to a preferred embodiment of the present invention. The top of housing 2502 supports two ratchet latches 2508 and 2802, and this is mirrored on the bottom of housing 2502. Ratchet latches 2508 and 2802 include reed springs attached to, or of one piece with, the ratchet head. The ratchet latches 2508 and 2802 allow the compact modular element 2500 to be snap fit into a modular support panel 3300, 3400, and 3502 (see FIGS. 33-35).

Figure 29:
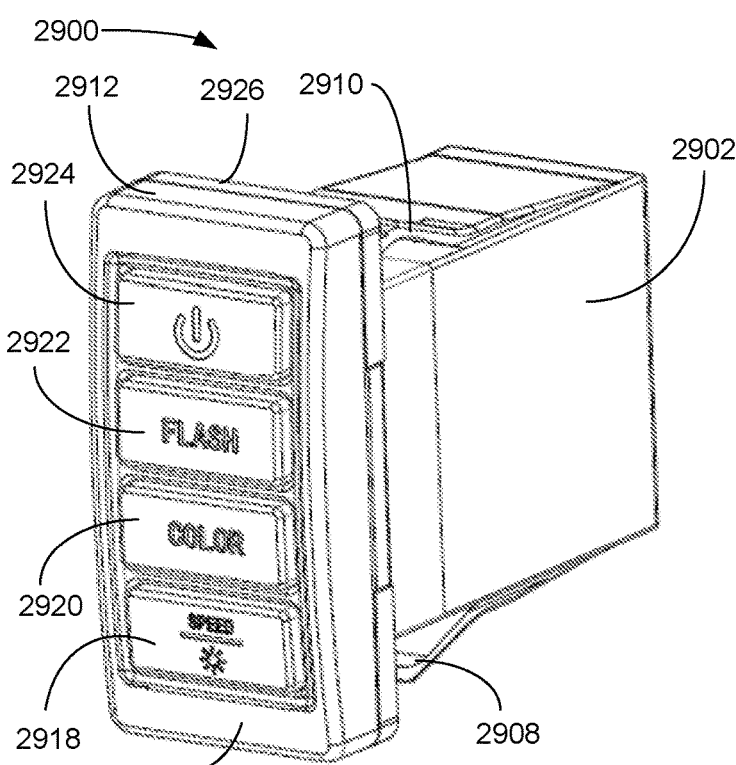
FIG. 29 is a front perspective view illustrating an exemplary eighth embodiment of a compact modular element of the modular entertainment control system, according to a preferred embodiment of the present invention.

FIG. 29 is a front perspective view illustrating an exemplary eighth embodiment of a compact modular element 2900 of the modular entertainment control system 3600, according to a preferred embodiment of the present invention. Compact modular element 2900 is a controller for a connected RGB LED light system (not shown). Top button 2924 is a power ON/OFF toggle for the lighting system. Second button 2822 toggles the lights to flash or remain steady. Third button 2920 selects the desired color of the lighting by repeated momentary depressions running through the range of colors that the lighting system can produce. In another preferred embodiment, button 2920 may be depressed and held to sequence through the color choices available. Bottom button 2918 determines the speed of the flashing of the lighting system by sequential or continuous depression. Compact modular element 2500 includes a housing 2502, a front panel support 2926, and a convex front panel 2814 with wide sides 2914, as shown. Housing 2902 supports top and bottom ratchet latches 2910 and 2908, respectively. Slightly arcuate front panel 2914 has four push button controls 2918, 2920, 2922, and 2924 mounted there on. Outer front panel 2914 covers supports for the internal electronics including switching logic and an RGB LED controller and, during assembly, is snap-fitted onto the front of the housing 2902. Connectivity is provided off the back plane (not shown) of the housing 2902. The wide sides 2914 have internal features that support the buttons 2918, 2920, 2922, and 2924.

Figure 30:
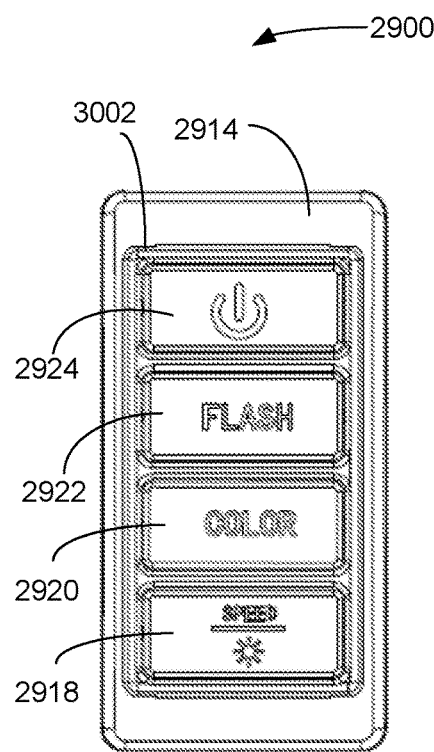
FIG. 30 is a front elevation view illustrating the exemplary eighth embodiment of the compact modular element of the modular entertainment control system of FIG. 29, according to a preferred embodiment of the present invention.

FIG. 30 is a front elevation view illustrating the exemplary eighth embodiment of the compact modular element 2900 of the modular entertainment control system 3600 of FIG. 29, according to a preferred embodiment of the present invention. Preferably, a socket 3002 surrounds the four push button controls 2918, 2920, 2922, and 2924.

Figure 31:
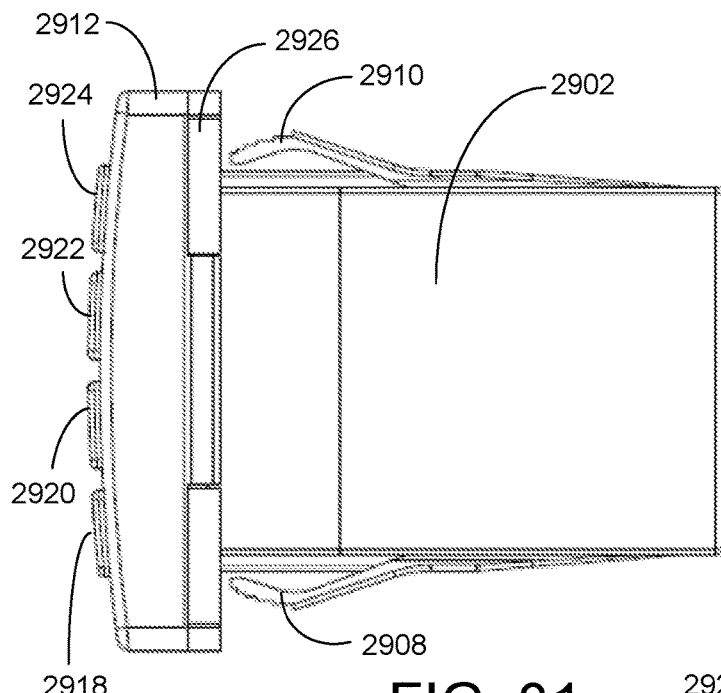
FIG. 31 is a side elevation view illustrating the eighth exemplary embodiment of the compact modular element of the modular entertainment control system of FIG. 29, according to a preferred embodiment of the present invention.

FIG. 31 is a side elevation view illustrating the eighth exemplary embodiment of the compact modular element 2900 of the modular entertainment control system 3600 of FIG. 29, according to a preferred embodiment of the present invention. Front panel support 2926 is preferably of one piece with housing 2902. Front panel 2914 supports the internal electronics and, during assembly, is inserted into the front of the housing 2902. Additional support for the internal electronics may be provided inside the housing 2902.

Figure 32:
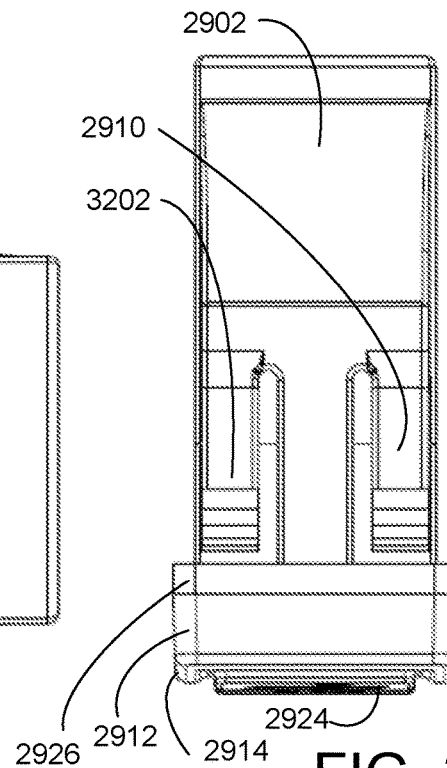
FIG. 32 is a top plan view illustrating the exemplary eighth embodiment of the compact modular element of the modular entertainment control system of FIG. 29, according to a preferred embodiment of the present invention.

FIG. 32 is a top plan view illustrating the exemplary eighth embodiment of the compact modular element 2900 of the modular entertainment control system 3600 of FIG. 29, according to a preferred embodiment of the present invention. The top of housing 2902 supports two ratchet latches 2910 and 3202, and this is mirrored on the bottom of housing 2902. Ratchet latches 2910 and 3202 include reed springs attached to, or of one piece with, the ratchet head. The ratchet latches 2910 and 3202 allow the compact modular element 2900 to be snap fit into a modular support panel 3300, 3400, and 3502 (see FIGS. 33-35).

Figure 33:
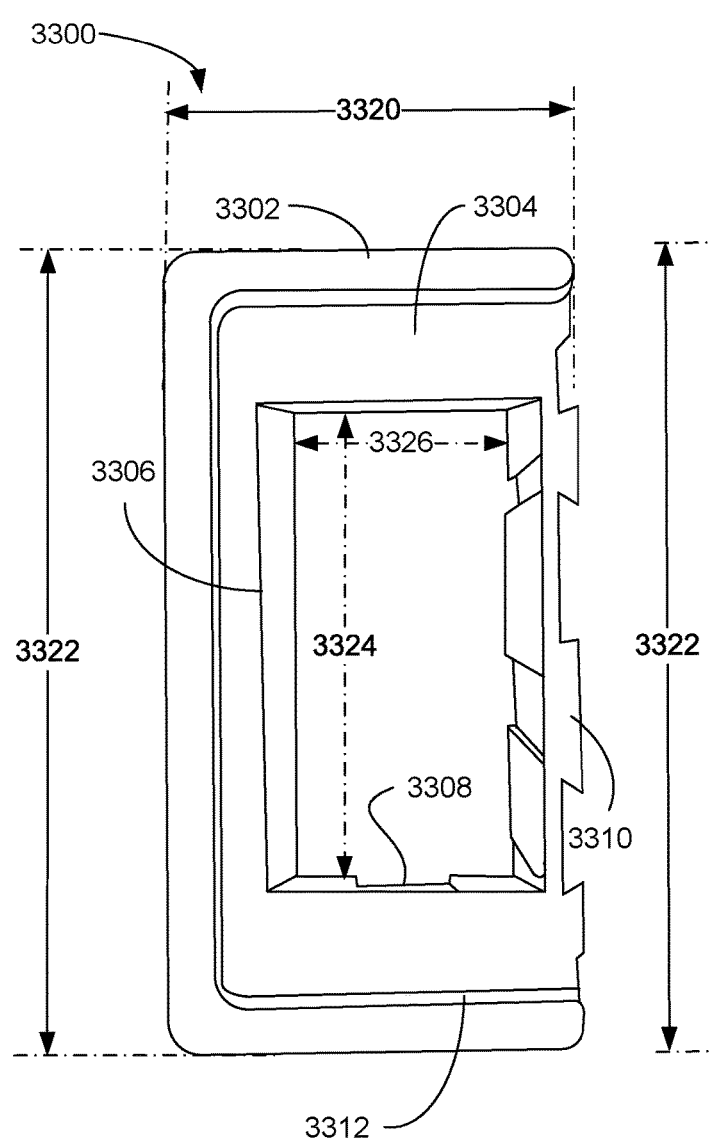
FIG. 33 is a front elevation view illustrating an exemplary embodiment of a modular mounting frame end piece for the compact modular elements of the modular entertainment control system of FIGS. 1, 5, 9, 13, 17, 21, 25, and 29 according to a preferred embodiment of the present invention.

FIG. 33 is a front elevation view illustrating an exemplary embodiment of a modular mounting frame left end piece 3300 for the compact modular elements 100, 500, 900, 1300, 1700, 2100, 2500, 2900 and 4000 of the modular entertainment control system 3600 of FIGS. 1-32 and 40A-F according to a preferred embodiment of the present invention. Modular mounting frame end piece 3300 has a width 3320 of three centimeters, a height 3222 of six centimeters, and includes an outer rim 3302 and inner rim 3312 along on three sides of a flat panel 3304 which has dovetail joints 3310 on a fourth side, as shown. Flat panel 3304 has a rectangular opening with a width 3326 of 2.1 centimeters and a height 3324 of 3.7 centimeters. Ratchet head receiver 33308 assists in snap fitting compact modular elements 100, 500, 900, 1300, 1700, 2100, 2500, 2900, or 4000 into place. Modular mounting frame end piece 3300 is preferably made of an electrically insulating and UV resistant material, such as UV resistant plastic.

Figure 34:
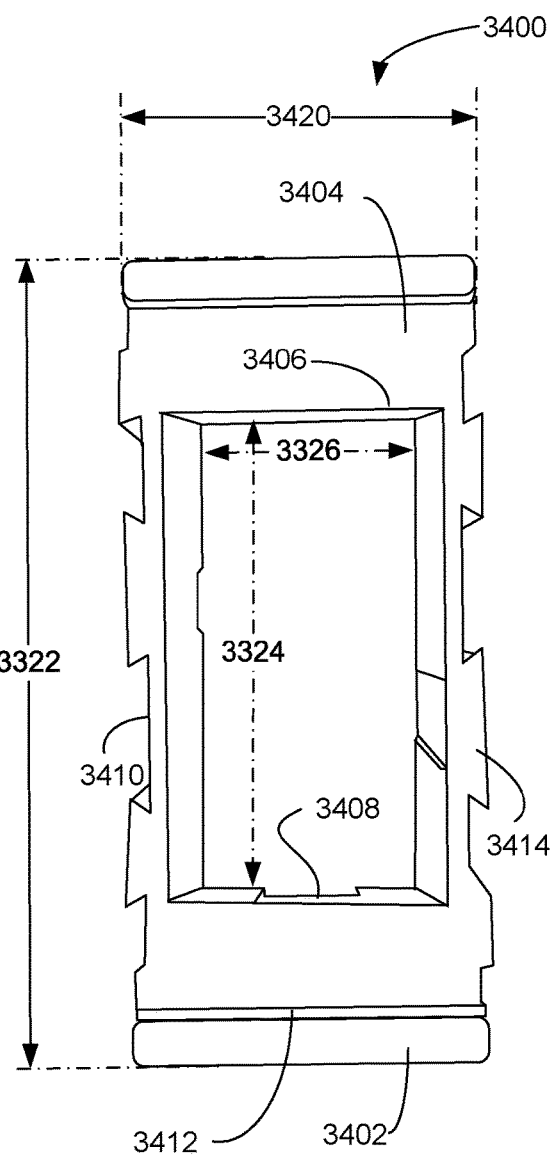
FIG. 34 is a front elevation view illustrating an exemplary embodiment of a modular mounting frame middle piece for the compact modular elements of the modular entertainment control system of FIGS. 1, 5, 9, 13, 17, 21, 25, and 29 according to a preferred embodiment of the present invention.

FIG. 34 is a front elevation view illustrating an exemplary embodiment of a modular mounting frame middle piece 3400 for the compact modular elements 100, 500, 900, 1300, 1700, 2100, 2500, 2900, or 4000 of the modular entertainment control system 3600 of FIGS. 1-32 and 40A-F according to a preferred embodiment of the present invention. Modular mounting frame end piece 3400 has a width 3420 of 2.5 centimeters, a height 3322 of six centimeters, and includes an outer rim 3402 and inner rim 3412 along on top and bottom sides of a flat panel 3404 which has dovetail joints 3414 on right and left long sides, as shown. Flat panel 3404 has a rectangular opening 3406 with a width 3326 of 2.1 centimeters and a height 3324 of 3.7 centimeters. Ratchet head receiver 3408 assists in snap fitting compact modular elements 100, 500, 900, 1300, 1700, 2100, 2500, 2900 or 4000 into place. Modular mounting frame middle piece 3400 is preferably made of an electrically insulating, marine grade, and UV resistant material, such as UV resistant plastic.

Figure 35:
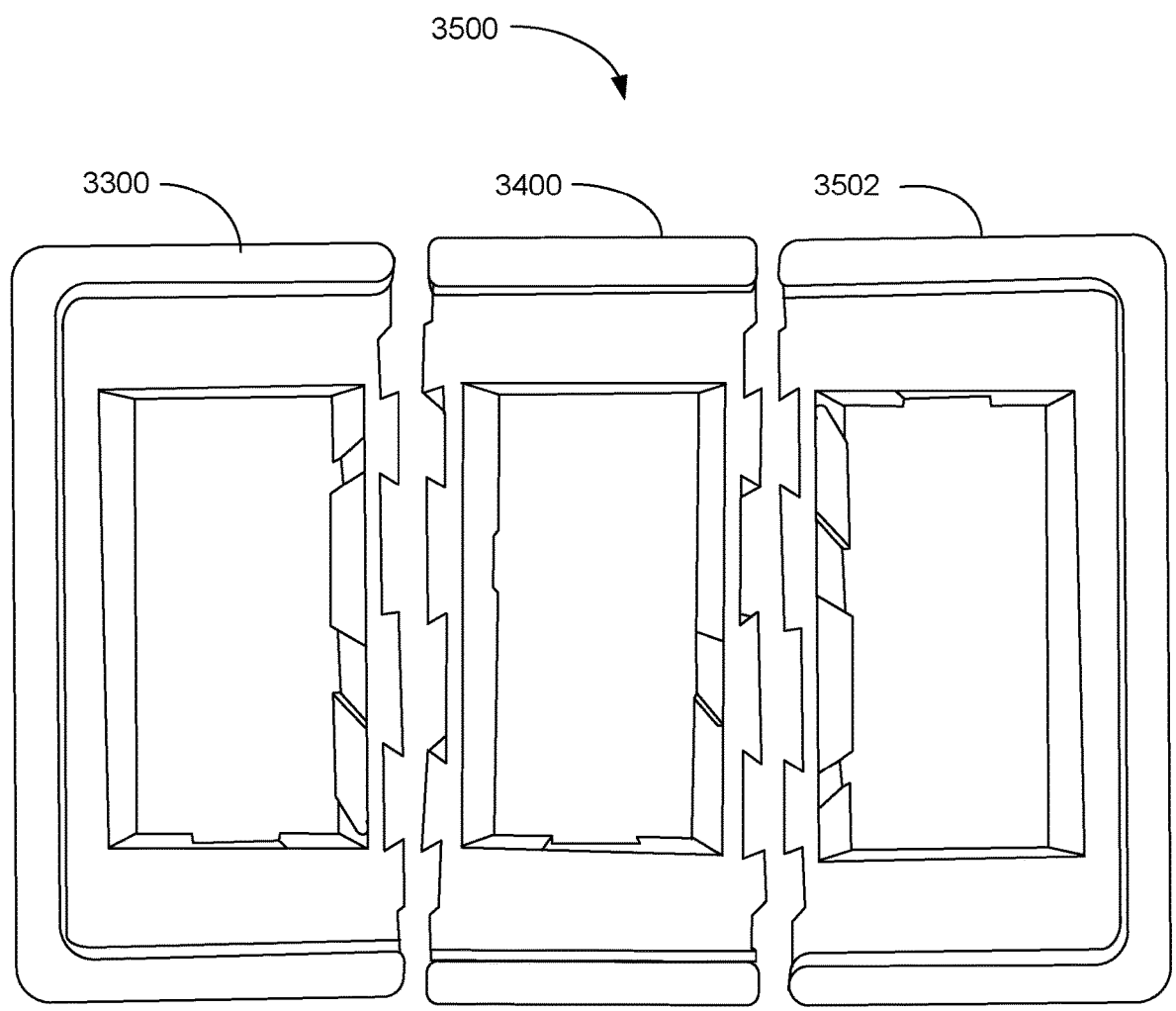
FIG. 35 is a front elevation view illustrating an exemplary embodiment of a three-piece modular mounting frame for the compact modular elements of the modular entertainment control system of FIGS. 1, 5, 9, 13, 17, 21, 25, and 29, according to a preferred embodiment of the present invention.

FIG. 35 is a front elevation exploded view illustrating an exemplary embodiment of a three-piece modular mounting frame 3500 for the compact modular elements 100, 500, 900, 1300, 1700, 2100, 2500, 2900, and/or 4000 of the modular entertainment control system 3600 of FIGS. 1, 5, 9, 13, 17, 21, 25, 29 and 40 according to a preferred embodiment of the present invention. Modular mounting frame left end piece 3300, modular mounting frame middle piece 3400, and modular mounting frame right end piece 3502 can be connected via dovetails to form a single three-socket frame. Any number of middle pieces 3400 may be added to make a mounting frame 3602 of any length for particular purposes. For example, the three-socket frame 3500 may support the FM receiver 2100, the music sharing element 2500, and the USB charger 500. A four-socket frame might add the Bluetooth® controller 900. Any combination of elements 100, 500, 900, 1300, 1700, 2100, 2500, 2900, and/or 4000 can be accommodated in as many sockets are needed.

Figure 36:
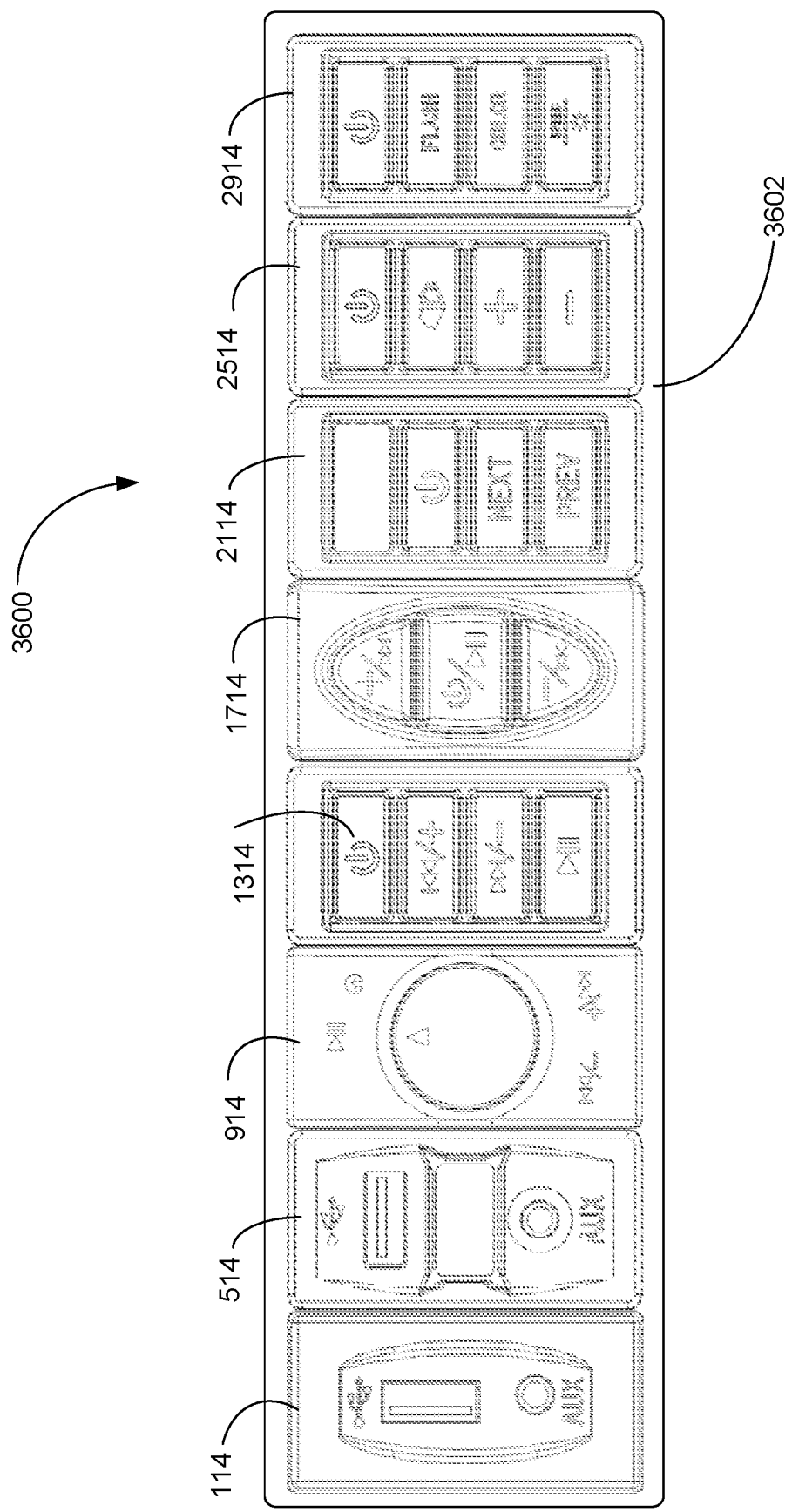
FIG. 36 is a front elevation view illustrating an exemplary embodiment of a modular entertainment control system of FIGS. 1, 5, 9, 13, 17, 21, 25, and 29 according to a preferred embodiment of the present invention.

FIG. 36 is a front elevation view illustrating an exemplary embodiment of a modular entertainment control system 3600 with compact modular elements 100, 500, 900, 1300, 1700, 2100, 2500, 2900, and/or 4000 of FIGS. 1-32 and 37A-40F according to a preferred embodiment of the present invention. Each compact modular elements 100, 500, 900, 1300, 1700, 2100, 2500, 2900, and 4000 is snap-fitted into a socket within panel 3602. More than one audio system may be controlled with the illustrated embodiment.

Figure 37A:
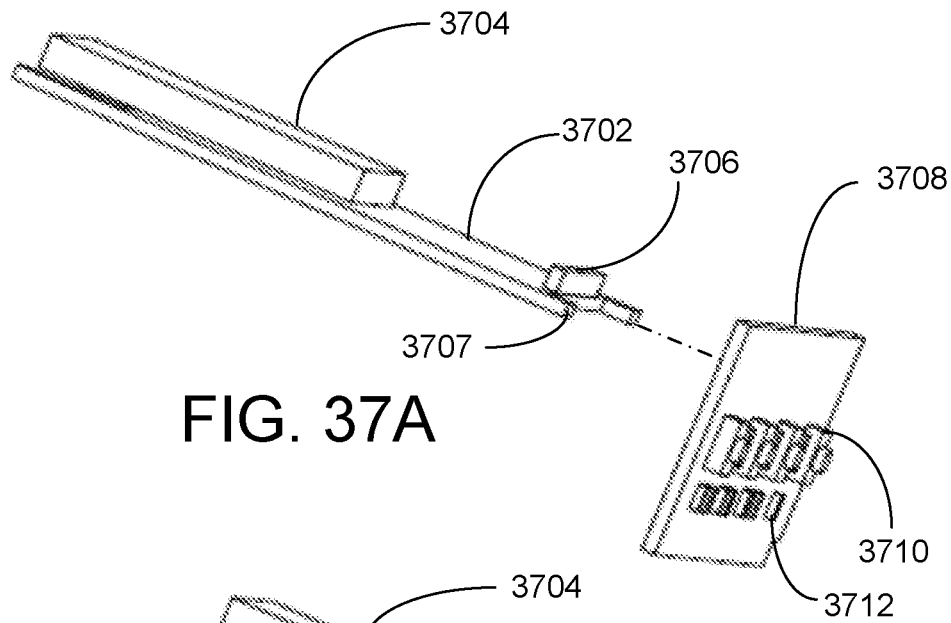
FIG. 37A is a side-bottom perspective view illustrating internal parts of the exemplary fourth embodiment of the compact modular element of the modular entertainment control system of FIG. 13 in an initial step of assembly, according to a preferred embodiment of the present invention.

FIG. 37A is a side-bottom perspective view illustrating internal parts of the exemplary fourth embodiment of the compact modular element 1300 of the modular entertainment control system 3600 of FIG. 13 in an initial step of assembly, according to a preferred embodiment of the present invention. Front panel 3708 is a printed circuit board (PCB) supporting four push buttons 3710 (one of four labeled) and associated circuit elements 3712 (one of four labeled), as well as rear surface electrical and mechanical connectors (not shown) for PCBs 3702 and 3714 (see FIG. 37C). PCB 3702 supports integrated circuit (IC) 3704, electrical connector 3706 and mechanical connectors 3707 (one of two labeled). In the first step, PCB 3702 is aligned to PCB front panel 3708.

Figure 37B:
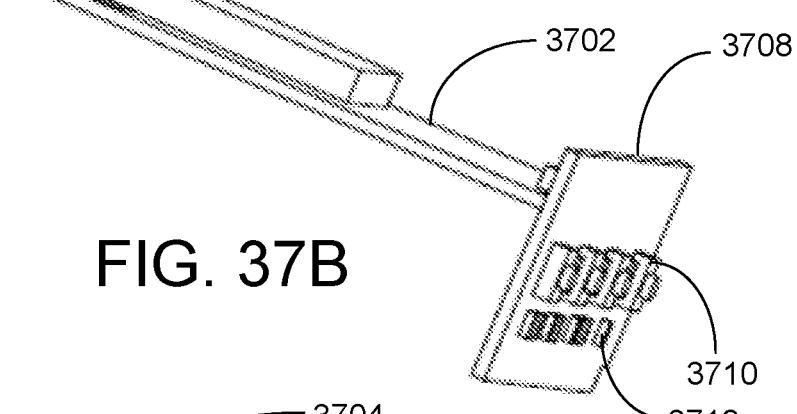
FIG. 37B is a side-bottom perspective view illustrating internal parts of the exemplary fourth embodiment of the compact modular element of the modular entertainment control system of FIG. 13 in an second step of assembly, according to a preferred embodiment of the present invention.

FIG. 37B is a side-bottom perspective view illustrating internal parts of the exemplary fourth embodiment of the compact modular element 1300 of the modular entertainment control system 3600 of FIG. 13 in an second step of assembly, according to a preferred embodiment of the present invention. PCB 3702 has been electrically and mechanically connected to PCB front panel 3708.

Figure 37C:
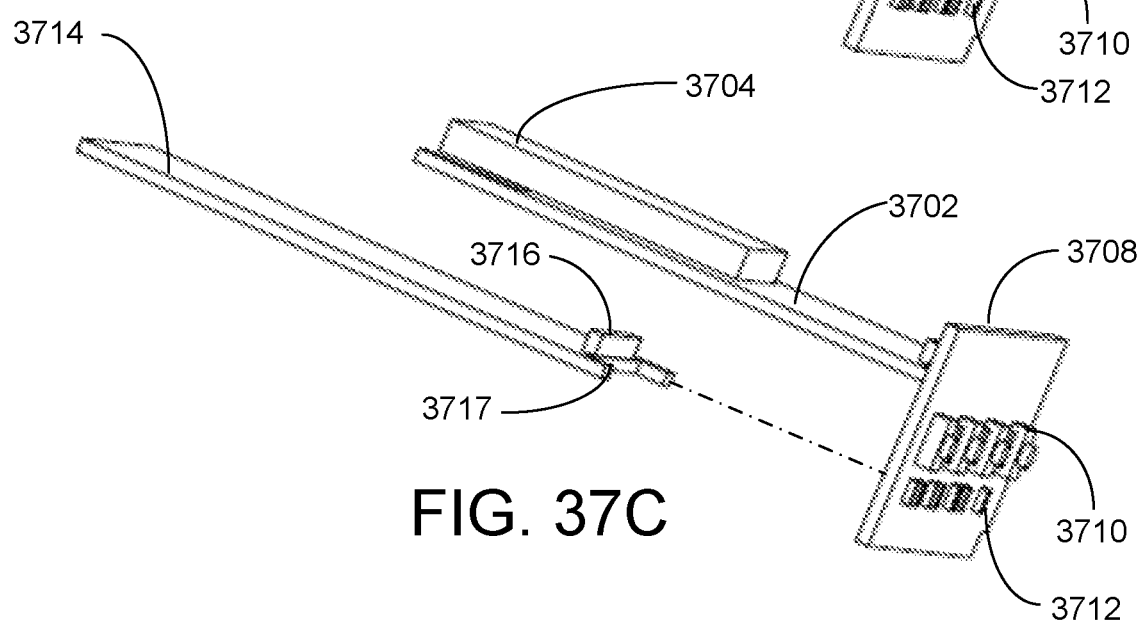
FIG. 37C is a side-bottom perspective view illustrating internal parts of the exemplary fourth embodiment of the compact modular element of the modular entertainment control system of FIG. 13 in an third step of assembly, according to a preferred embodiment of the present invention.

FIG. 37C is a side-bottom perspective view illustrating internal parts of the exemplary fourth embodiment of the compact modular element 1300 of the modular entertainment control system 3600 of FIG. 13 in an third step of assembly, according to a preferred embodiment of the present invention. In the third step, PCB 3714 is aligned to PCB front panel 3708. PCB 3714 includes mechanical connectors 3717 (one of two labeled) and electrical connector 3716.

Figure 37D:
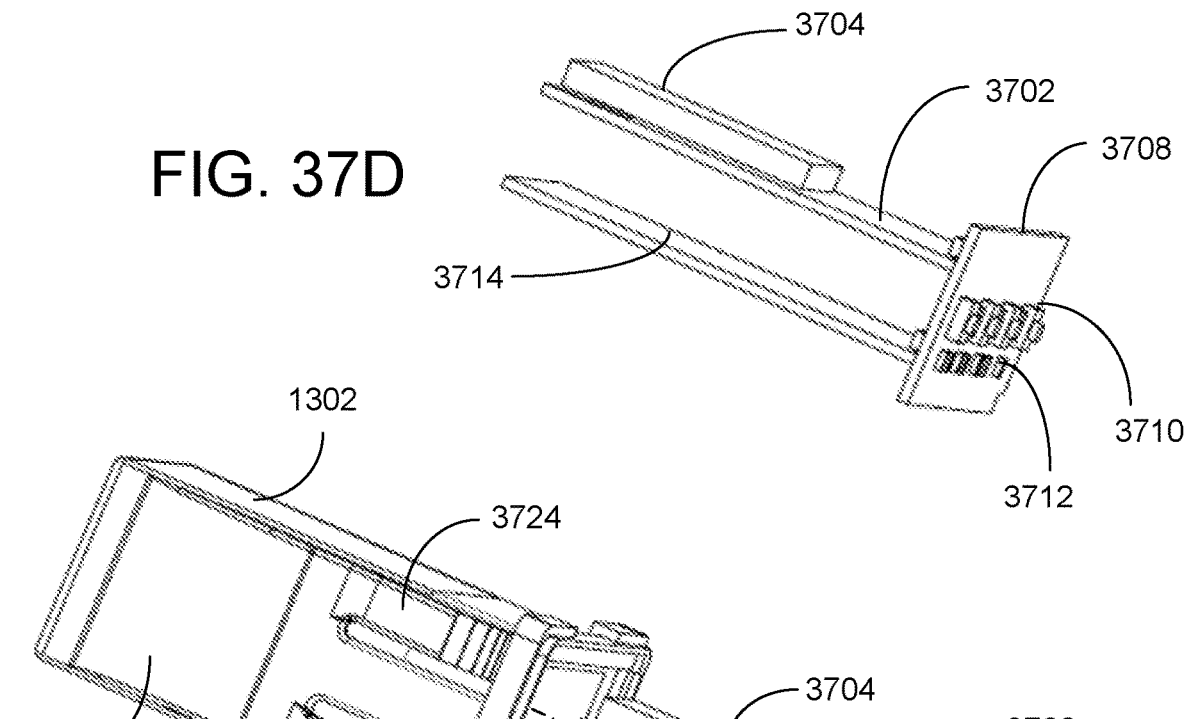
FIG. 37D is a side-bottom perspective view illustrating internal parts of the exemplary fourth embodiment of the compact modular element of the modular entertainment control system of FIG. 13 in an fourth step of assembly, according to a preferred embodiment of the present invention.

FIG. 37D is a side-bottom perspective view illustrating internal parts of the exemplary fourth embodiment of the compact modular element 1300 of the modular entertainment control system 3600 of FIG. 13 in an fourth step of assembly, according to a preferred embodiment of the present invention. PCB 3714 has been mechanically and electrically connected to PCB front panel 3708.

Figure 37E:
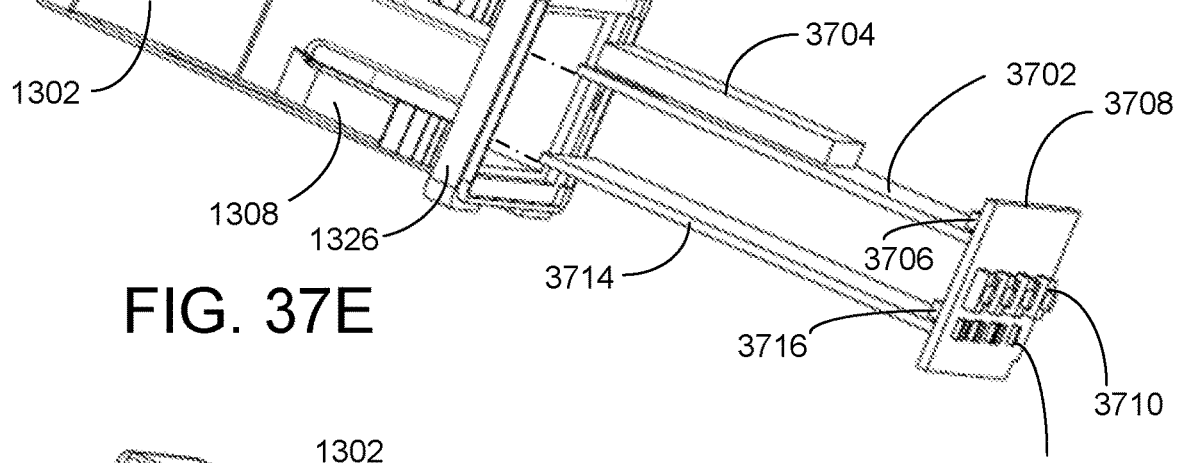
FIG. 37E is a side-bottom perspective view illustrating external and internal parts of the exemplary fourth embodiment of the compact modular element of the modular entertainment control system of FIG. 13 in an fifth step of assembly, according to a preferred embodiment of the present invention.

FIG. 37E is a side-bottom perspective view illustrating external and internal parts of the exemplary fourth embodiment of the compact modular element 1300 of the modular entertainment control system 3600 of FIG. 13 in an fifth step of assembly, according to a preferred embodiment of the present invention. The assembly, comprising internal PCBs 3702, 3714, and 3708, is aligned to housing 1302.

Figure 37F:
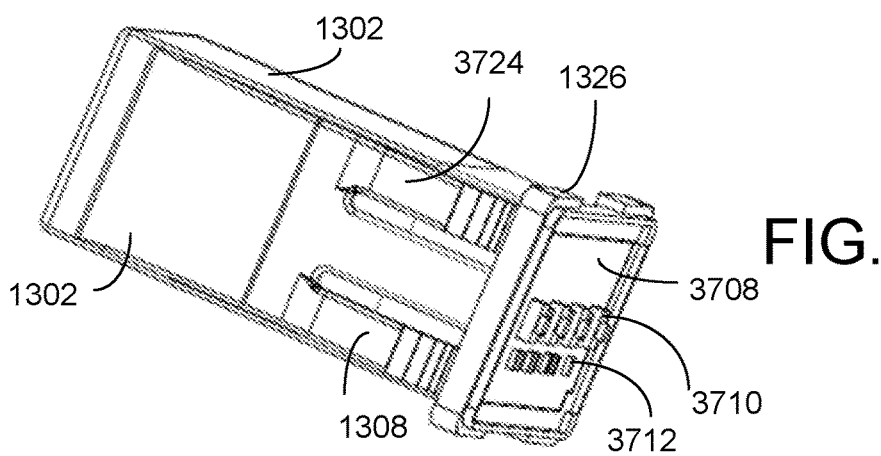
FIG. 37F is a side-bottom perspective view illustrating external and internal parts of the exemplary fourth embodiment of the compact modular element of the modular entertainment control system of FIG. 13 in an sixth step of assembly, according to a preferred embodiment of the present invention.

FIG. 37F is a side-bottom perspective view illustrating external and internal parts of the exemplary fourth embodiment of the compact modular element 1300 of the modular entertainment control system 3600 of FIG. 13 in an sixth step of assembly, according to a preferred embodiment of the present invention. The assembly of internal PCBs 3702, 3714, and 3708 is snap-fitted into housing 1302.

Figure 37G:
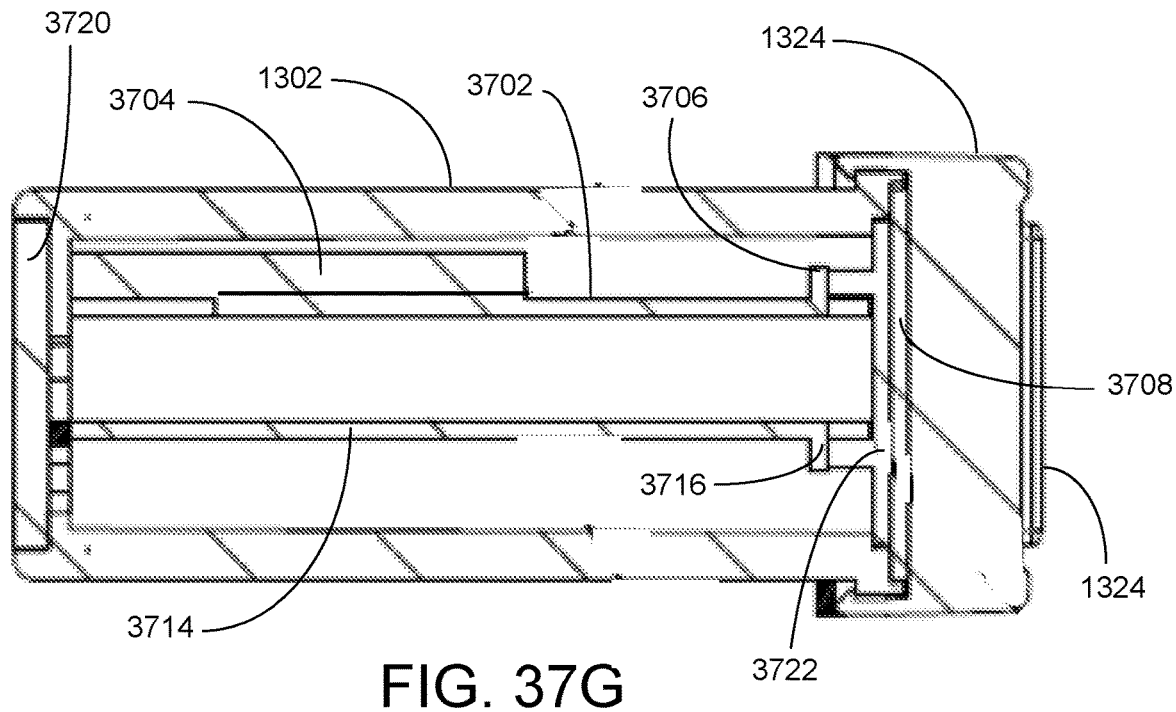
FIG. 37G is a bottom cross sectional view illustrating external and internal parts of the exemplary fourth embodiment of the compact modular element of the modular entertainment control system of FIG. 13 after a seventh step of assembly, according to a preferred embodiment of the present invention.

FIG. 37G is a bottom cross sectional view illustrating external and internal parts of the exemplary fourth embodiment of the compact modular element 1300 of the modular entertainment control system 3600 of FIG. 13 after a seventh step of assembly, according to a preferred embodiment of the present invention. Rear connector 3722, part of PCB front plate 3708, is shown connected mechanically and electrically to PCBs 3714 and 3702. Back plate 3720 provides conduits and wires from PCBs 3702 and 3714 to the audio equipment to be controlled. Front panel 1324 is a tactile interface to the push buttons 3712 on PCB front panel 3708.

Figure 37H:
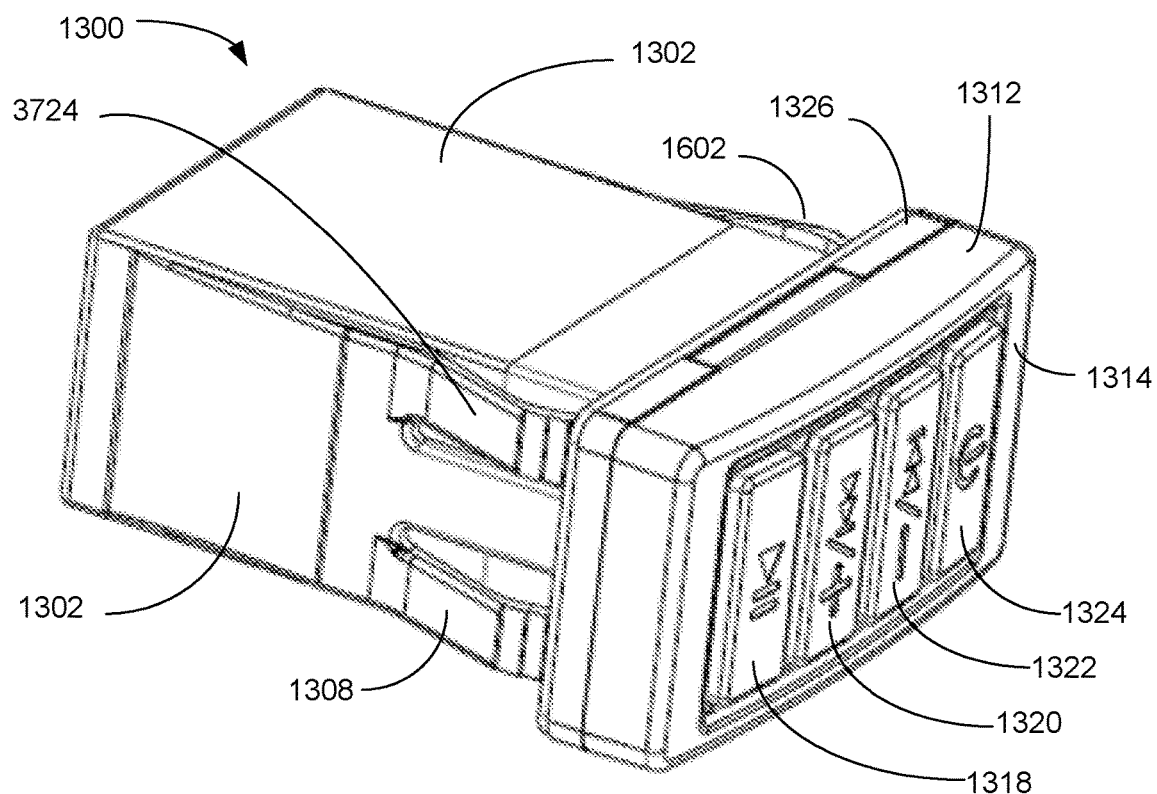
FIG. 37H is a side-bottom perspective view illustrating external parts of the exemplary fourth embodiment of the compact modular element of the modular entertainment control system of FIG. 13 after a seventh step of assembly, according to a preferred embodiment of the present invention.

FIG. 37H is a side-bottom perspective view illustrating external parts of the exemplary fourth embodiment of the compact modular element 1300 of the modular entertainment control system 3600 of FIG. 13 after a seventh step of assembly, according to a preferred embodiment of the present invention. The seventh step comprising snap-fitting the tactile interface front panel 1324 to housing 1302 to engage PCB front panel 3708. Bottom ratchet latch 3724, not seen in other views, is shown here.

Figure 38A:
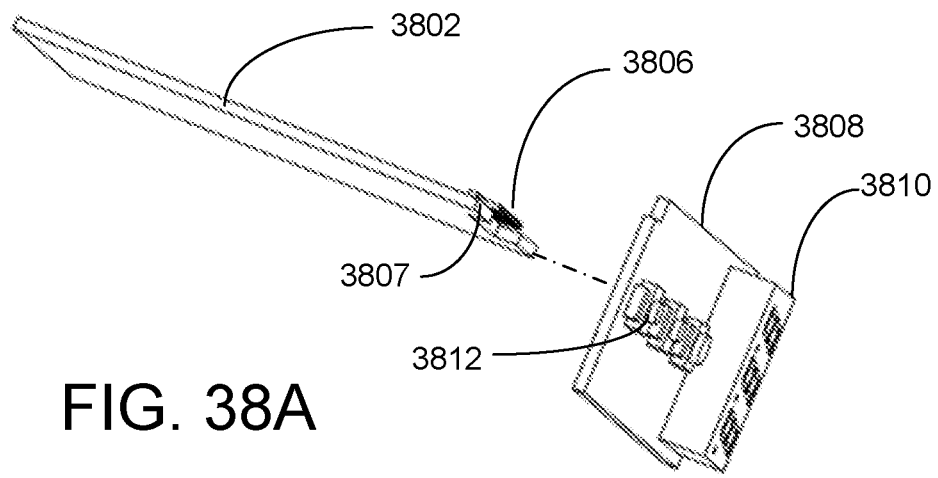
FIG. 38A is a side-bottom perspective view illustrating internal parts of the exemplary sixth embodiment of the compact modular element of the modular entertainment control system of FIG. 21 in an initial step of assembly, according to a preferred embodiment of the present invention.

FIG. 38A is a side-bottom perspective view illustrating internal parts of the exemplary sixth embodiment of the compact modular element 2100 of the modular entertainment control system 3600 of FIG. 21 in an initial step of assembly, according to a preferred embodiment of the present invention. Front panel 3808 is a printed circuit board (PCB) supporting three push buttons 3812 (one of three labeled), a digital display element 3810, and associated circuit elements, as well as rear surface electrical and mechanical connectors (not shown) for PCBs 3802 and 3814 (see FIG. 38C). PCB 3802 supports electrical connector 3806 and mechanical connectors 3807 (one of two labeled). In the first step, PCB 3802 is aligned to PCB front panel 3808.

Figure 38B:
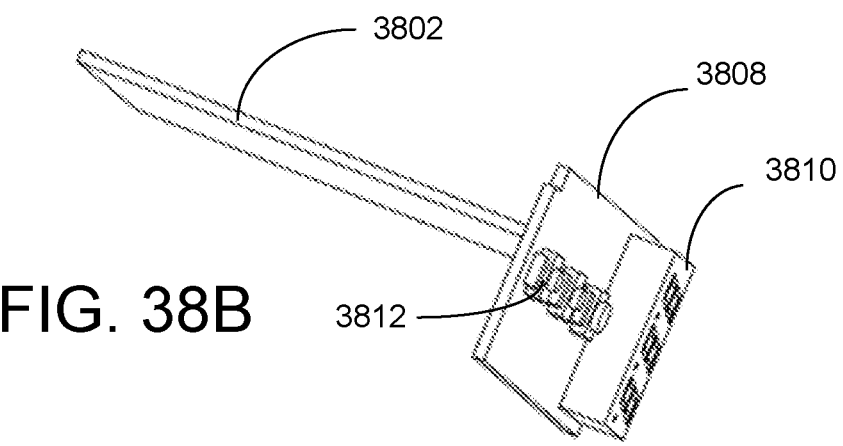
FIG. 38B is a side-bottom perspective view illustrating internal parts of the exemplary sixth embodiment of the compact modular element of the modular entertainment control system of FIG. 21 in a second step of assembly, according to a preferred embodiment of the present invention.

FIG. 38B is a side-bottom perspective view illustrating internal parts of the exemplary sixth embodiment of the compact modular element 2100 of the modular entertainment control system 3600 of FIG. 21 in a second step of assembly, according to a preferred embodiment of the present invention. PCB 3802 has been electrically and mechanically connected to PCB front panel 3808.

Figure 38C:
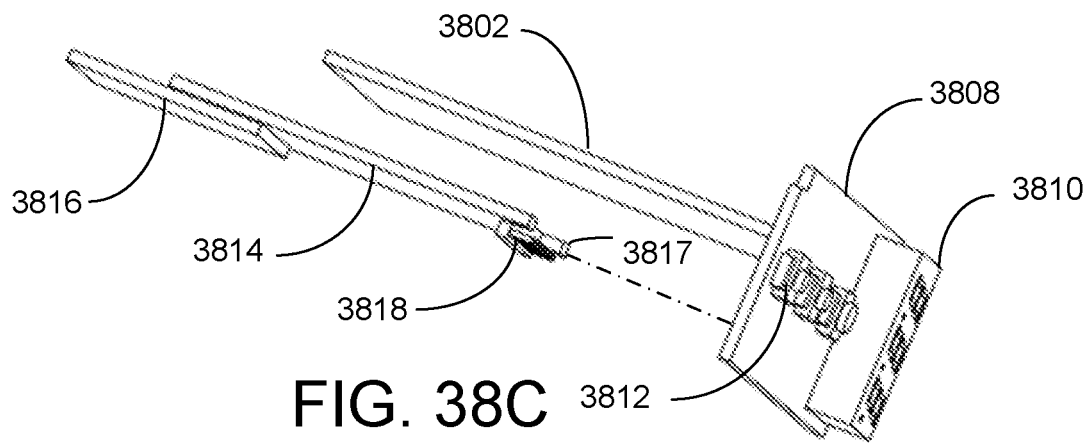
FIG. 38C is a side-bottom perspective view illustrating internal parts of the exemplary sixth embodiment of the compact modular element of the modular entertainment control system of FIG. 21 in a third step of assembly, according to a preferred embodiment of the present invention.

FIG. 38C is a side-bottom perspective view illustrating internal parts of the exemplary sixth embodiment of the compact modular element 2100 of the modular entertainment control system 3600 of FIG. 21 in a third step of assembly, according to a preferred embodiment of the present invention. In the third step, PCB 3814 is aligned to PCB front panel 3808. PCB 3814 supports piggy back PCB 3816 and includes mechanical connectors 3817 (one of two labeled), and electrical connector 3818. Piggy back PCB 3816 enables additional circuitry without extending the length beyond what the housing 2102 can accommodate.

Figure 38D:
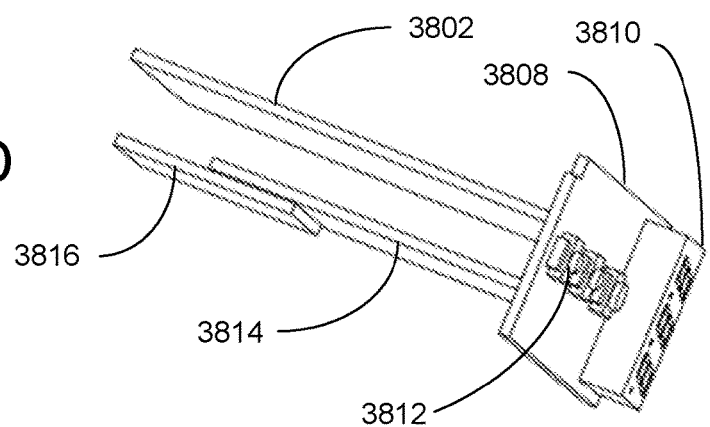
FIG. 38D is a side-bottom perspective view illustrating internal parts of the exemplary sixth embodiment of the compact modular element of the modular entertainment control system of FIG. 21 in a fourth step of assembly, according to a preferred embodiment of the present invention.

FIG. 38D is a side-bottom perspective view illustrating internal parts of the exemplary sixth embodiment of the compact modular element 2100 of the modular entertainment control system 3600 of FIG. 21 in a fourth step of assembly, according to a preferred embodiment of the present invention. PCB 3814 has been mechanically and electrically connected to PCB front panel 3808.

Figure 38E:
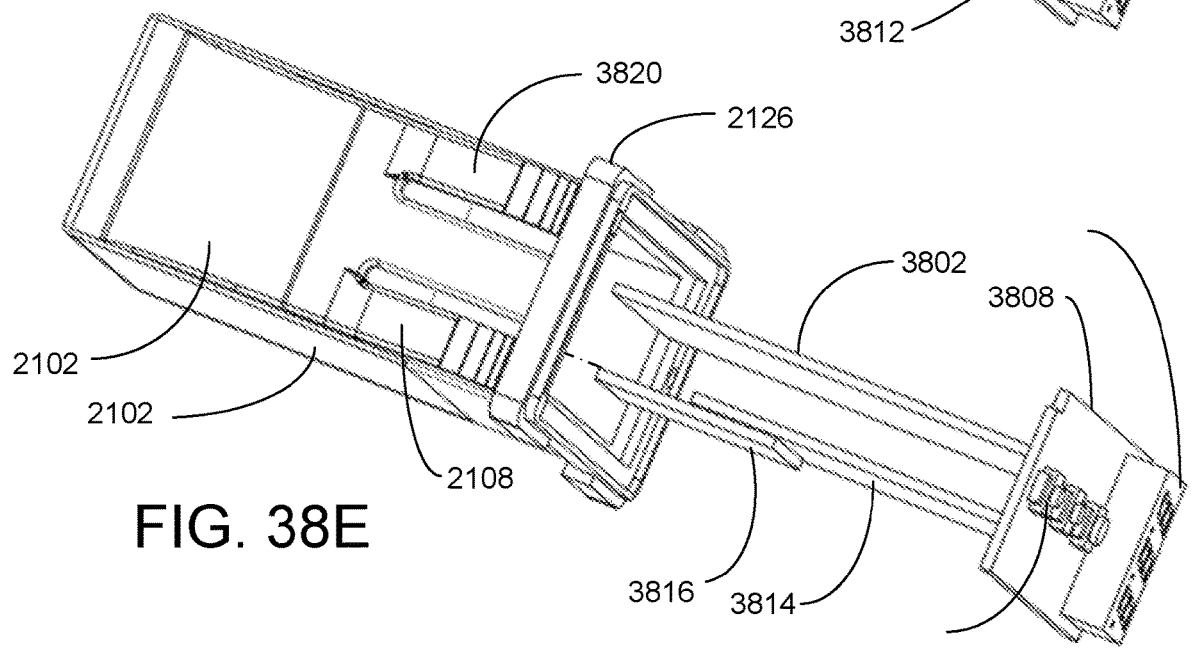
FIG. 38E is a side-bottom perspective view illustrating external and internal parts of the exemplary sixth embodiment of the compact modular element of the modular entertainment control system of FIG. 21 in an fifth step of assembly, according to a preferred embodiment of the present invention.

FIG. 38E is a side-bottom perspective view illustrating external and internal parts of the exemplary sixth embodiment of the compact modular element 2100 of the modular entertainment control system 3600 of FIG. 21 in an fifth step of assembly, according to a preferred embodiment of the present invention. The assembly, comprising internal PCBs 3802, 3814, 3816, and 3808, is aligned to housing 2102. Bottom ratchet latch 3820, not visible in previous views, can be seen here.

Figure 38F:
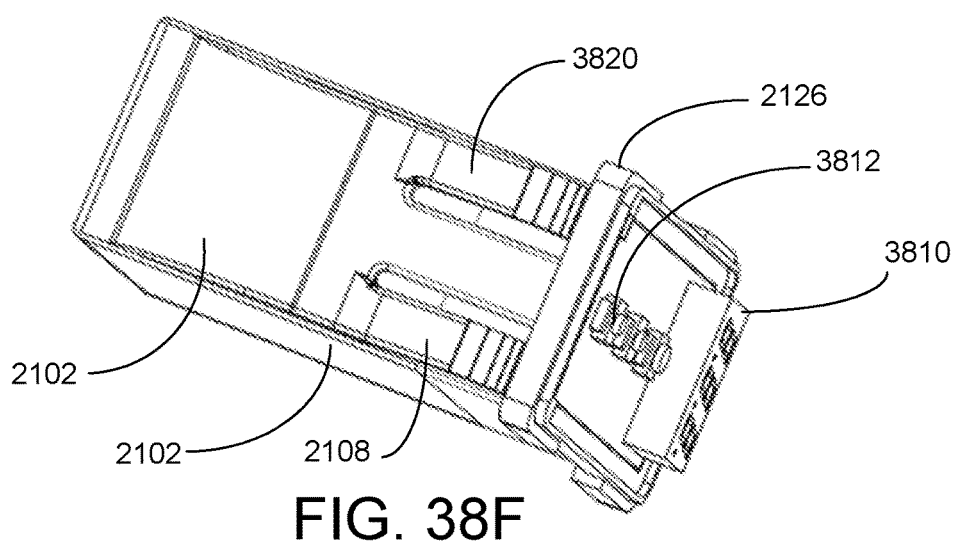
FIG. 38F is a side-bottom perspective view illustrating external and internal parts of the exemplary sixth embodiment of the compact modular element of the modular entertainment control system of FIG. 21 in an sixth step of assembly, according to a preferred embodiment of the present invention.

FIG. 38F is a side-bottom perspective view illustrating external and internal parts of the exemplary sixth embodiment of the compact modular element 2100 of the modular entertainment control system 3600 of FIG. 21 in an sixth step of assembly, according to a preferred embodiment of the present invention. The assembly of internal PCBs 3802, 3814, 3816, and 3808 is snap-fitted into housing 2102.

Figure 38G:
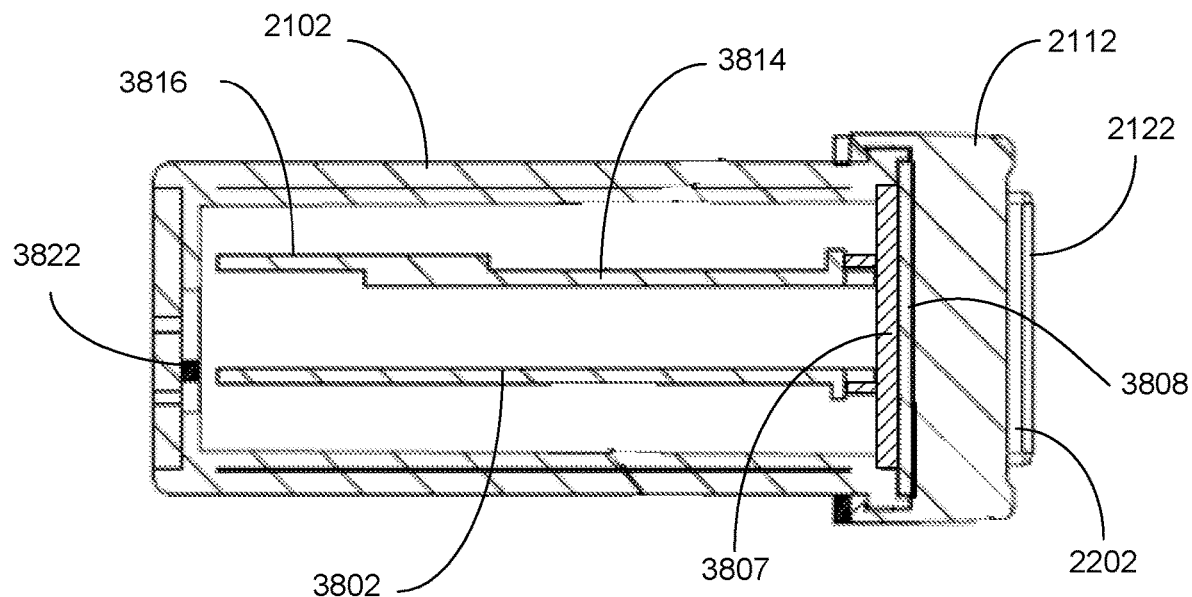
FIG. 38G is a top cross sectional view illustrating external and internal parts of the exemplary sixth embodiment of the compact modular element of the modular entertainment control system of FIG. 21 after a seventh step of assembly, according to a preferred embodiment of the present invention.

FIG. 38G is a top cross sectional view illustrating external and internal parts of the exemplary sixth embodiment of the compact modular element 2100 of the modular entertainment control system 3600 of FIG. 21 after a seventh step of assembly, according to a preferred embodiment of the present invention. Rear connector 3807, part of PCB front plate 3808, is shown connected mechanically and electrically to PCBs 3814 and 3802. Back plate 3822 provides conduits and wires from PCBs 3802 and 3814 to the audio equipment to be controlled. Front panel 2112 provides a tactile interface to the push buttons 3812 on PCB front panel 3808 and a viewing port to the digital display 3810.

Figure 38H:
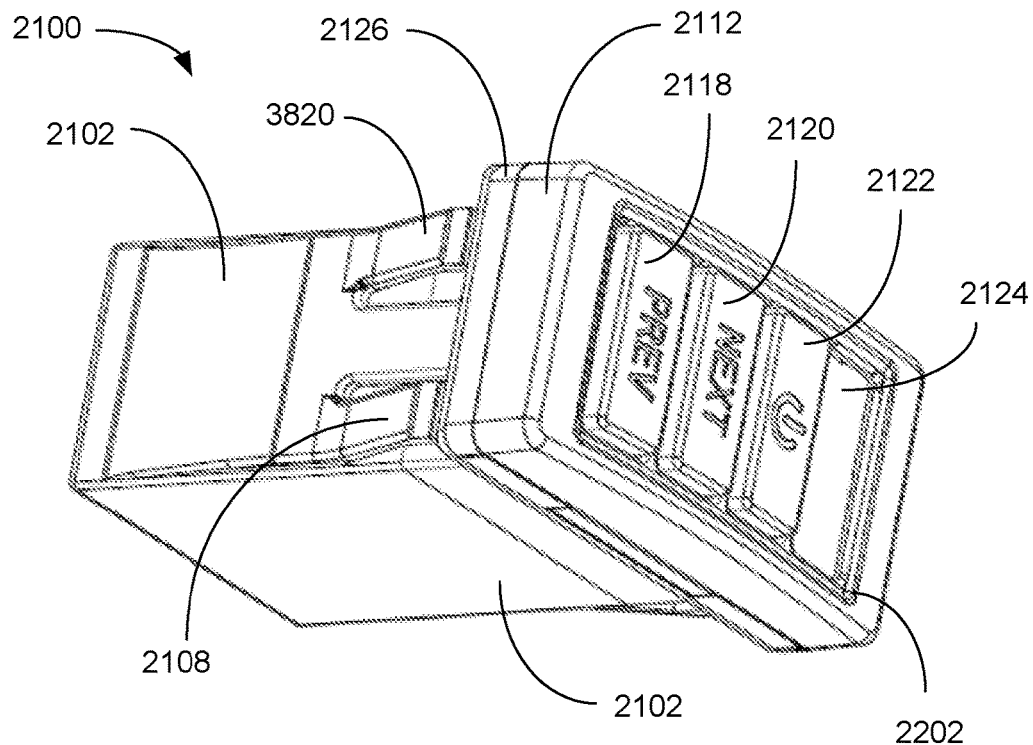
FIG. 38H is a side-bottom perspective view illustrating the exemplary sixth embodiment of the compact modular element of the modular entertainment control system of FIG. 21 after a seventh step of assembly, according to a preferred embodiment of the present invention.

FIG. 38H is a side-bottom perspective view illustrating the exemplary sixth embodiment of the compact modular element 2100 of the modular entertainment control system 3600 of FIG. 21 after a seventh step of assembly, according to a preferred embodiment of the present invention. The seventh step comprises snap-fitting the tactile interface convex front panel 2112 to housing 2102 to engage PCB front panel 3808.

Figure 39A:
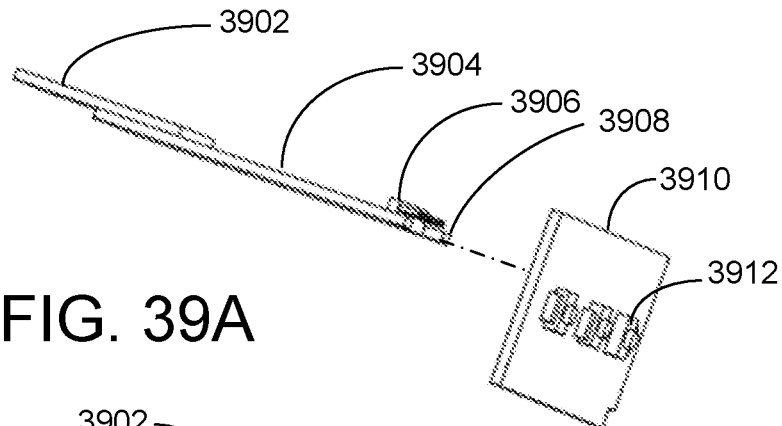
FIG. 39A is a side-bottom perspective view illustrating internal parts of the exemplary fifth embodiment of the compact modular element of the modular entertainment control system of FIG. 17 in an initial step of assembly, according to a preferred embodiment of the present invention.

FIG. 39A is a side-bottom perspective view illustrating internal parts of the exemplary fifth embodiment of the compact modular element 1700 of the modular entertainment control system 3600 of FIG. 17 in an initial step of assembly, according to a preferred embodiment of the present invention. Front panel 3910 is a printed circuit board (PCB) supporting three push buttons 3912 (one of three labeled) and associated circuit elements, as well as rear surface electrical and mechanical connectors (not shown) for PCBs 3904 and 3914 (see FIG. 39C). PCB 3904 supports electrical connector 3906, mechanical connectors 3908 (one of two labeled), and piggy back PCB 3902. In the first step, PCB 3904 is aligned to PCB front panel 3910.

Figure 39B:
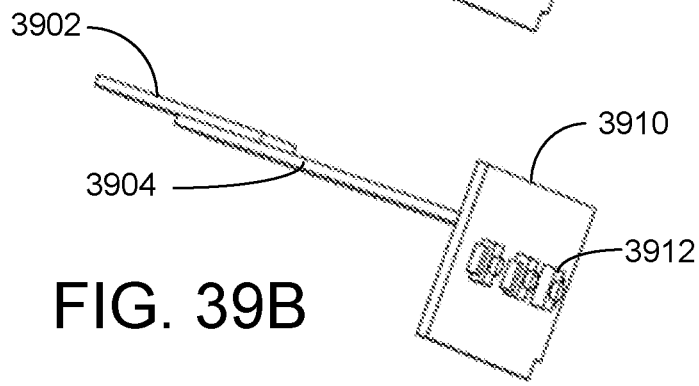
FIG. 39B is a side-bottom perspective view illustrating internal parts of the exemplary fifth embodiment of the compact modular element of the modular entertainment control system of FIG. 17 in a second step of assembly, according to a preferred embodiment of the present invention.

FIG. 39B is a side-bottom perspective view illustrating internal parts of the exemplary fifth embodiment of the compact modular element 1700 of the modular entertainment control system 3600 of FIG. 17 in a second step of assembly, according to a preferred embodiment of the present invention. PCB 3904 has been electrically and mechanically connected to PCB front panel 3910.

Figure 39C:
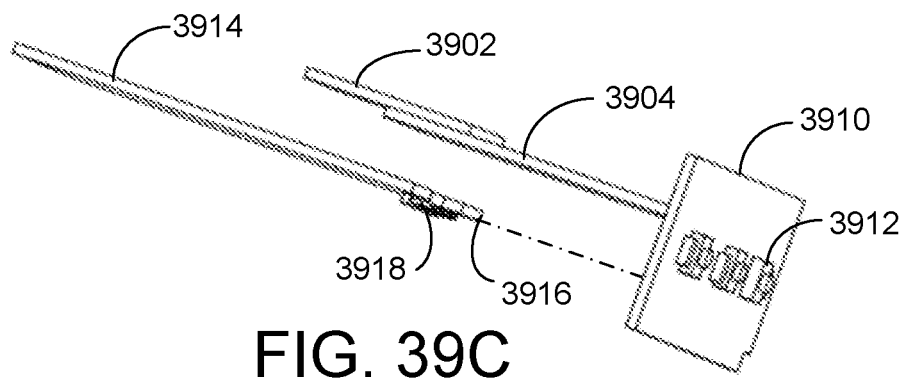
FIG. 39C is a side-bottom perspective view illustrating internal parts of the exemplary fifth embodiment of the compact modular element of the modular entertainment control system of FIG. 17 in a third step of assembly, according to a preferred embodiment of the present invention.

FIG. 39C is a side-bottom perspective view illustrating internal parts of the exemplary fifth embodiment of the compact modular element 1700 of the modular entertainment control system 3600 of FIG. 17 in a third step of assembly, according to a preferred embodiment of the present invention. In the third step, PCB 3914 is aligned to PCB front panel 3910. PCB 3914 includes mechanical connectors 3916 (one of two labeled), and electrical connector 3918.

Figure 39D:
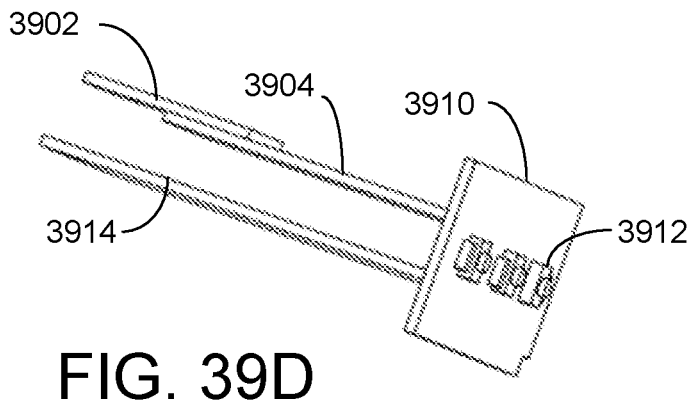
FIG. 39D is a side-bottom perspective view illustrating internal parts of the exemplary fifth embodiment of the compact modular element of the modular entertainment control system of FIG. 17 in a fourth step of assembly, according to a preferred embodiment of the present invention.

FIG. 39D is a side-bottom perspective view illustrating internal parts of the exemplary fifth embodiment of the compact modular element 1700 of the modular entertainment control system 3600 of FIG. 17 in a fourth step of assembly, according to a preferred embodiment of the present invention. PCB 3914 has been mechanically and electrically connected to PCB front panel 3910.

Figure 39E:
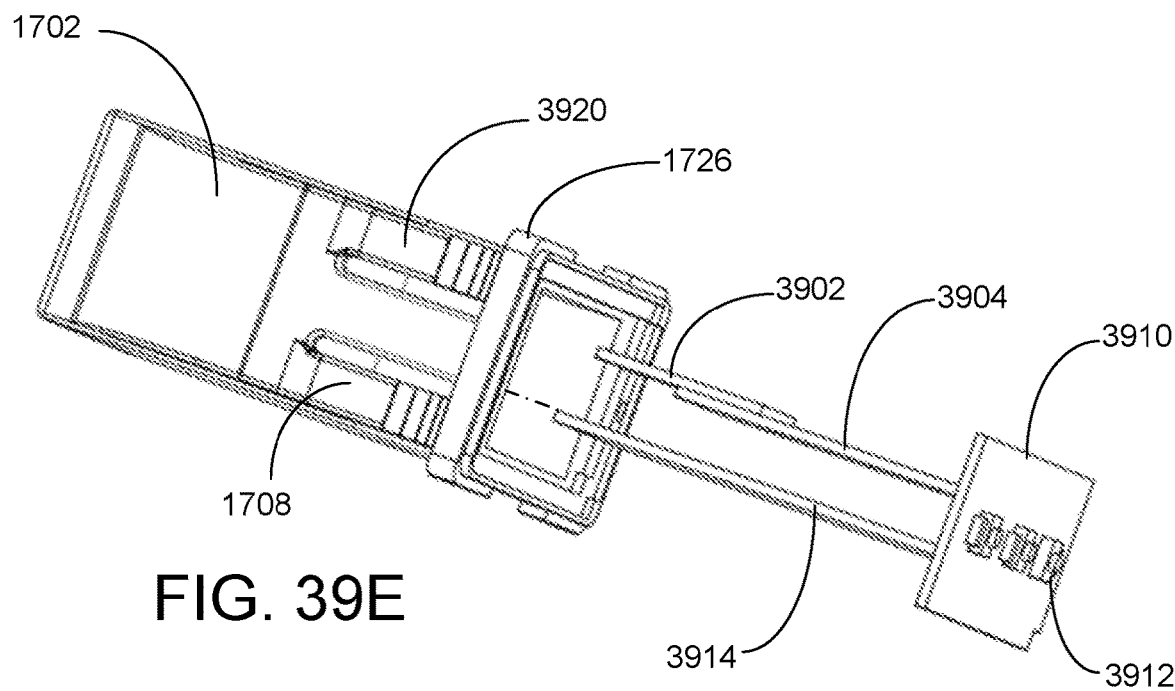
FIG. 39E is a side-bottom perspective view illustrating external and internal parts of the exemplary fifth embodiment of the compact modular element of the modular entertainment control system of FIG. 17 in an fifth step of assembly, according to a preferred embodiment of the present invention.

FIG. 39E is a side-bottom perspective view illustrating external and internal parts of the exemplary fifth embodiment of the compact modular element of the modular entertainment control system of FIG. 17 in an fifth step of assembly, according to a preferred embodiment of the present invention. The assembly, comprising internal PCBs 3902, 3904, 3914, and 3910, is aligned to housing 1702. Bottom ratchet latch 3920, not visible in previous views, can be seen here.

Figure 39F:
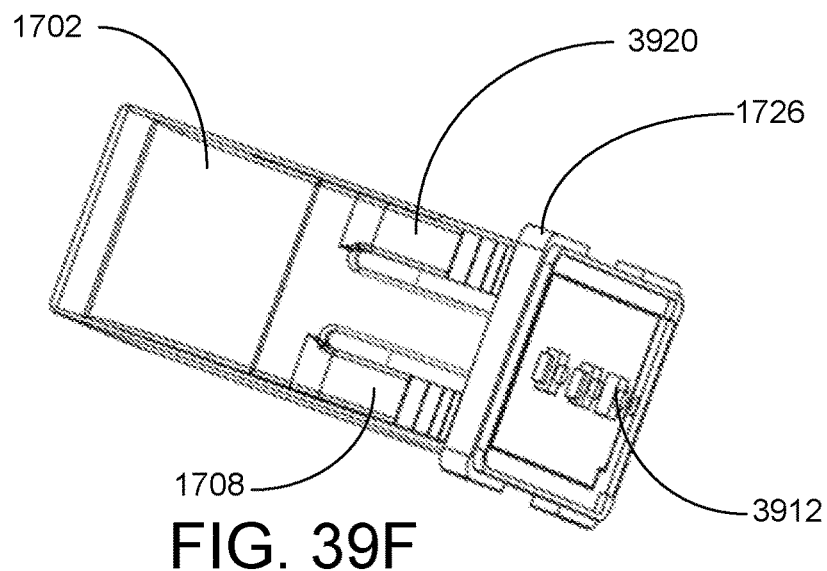
FIG. 39F is a side-bottom perspective view illustrating external and internal parts of the exemplary fifth embodiment of the compact modular element of the modular entertainment control system of FIG. 17 in an sixth step of assembly, according to a preferred embodiment of the present invention.

FIG. 39F is a side-bottom perspective view illustrating external and internal parts of the exemplary fifth embodiment of the compact modular element 1700 of the modular entertainment control system 3600 of FIG. 17 in an sixth step of assembly, according to a preferred embodiment of the present invention. The assembly of internal PCBs 3902, 3904, 3914, and 3910 is snap-fitted into housing 1702.

Figure 39G:
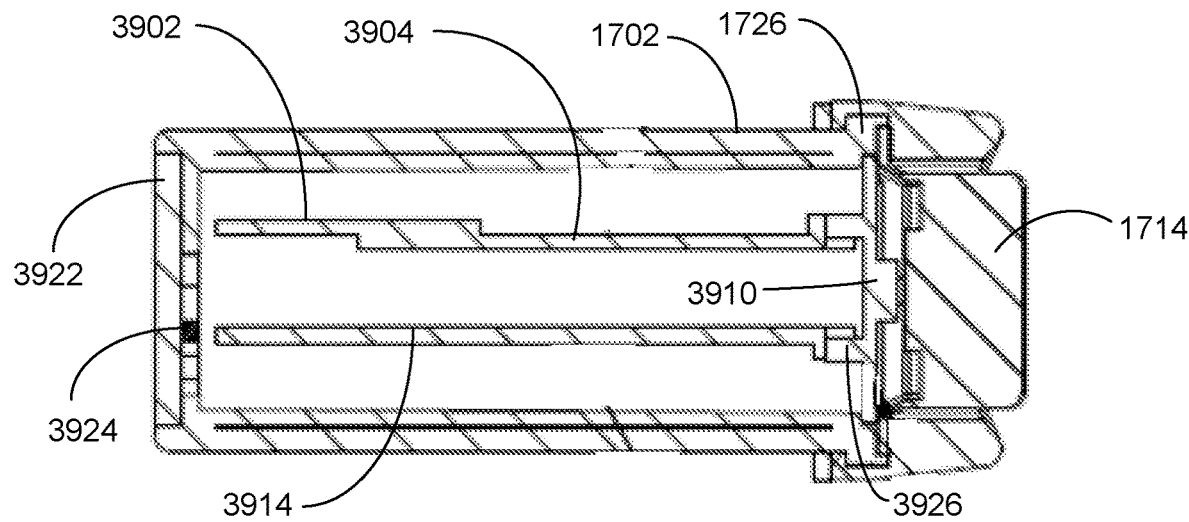
FIG. 39G is a top cross sectional view illustrating external and internal parts of the exemplary sixth embodiment of the compact modular element of the modular entertainment control system of FIG. 17 after a seventh step of assembly, according to a preferred embodiment of the present invention.

FIG. 39G is a top cross sectional view illustrating external and internal parts of the exemplary sixth embodiment of the compact modular element 1700 of the modular entertainment control system of FIG. 17 after a seventh step of assembly, according to a preferred embodiment of the present invention. Rear connector 3926, part of PCB front panel 3910, is shown connected mechanically and electrically to PCBs 3914 and 3904. Back plate 3922 provides conduits and wires from PCBs 3902 and 3914 to the audio equipment to be controlled. Front panel 1714 provides a tactile interface to the push buttons 3912 on PCB front panel 3910.

Figure 39H:
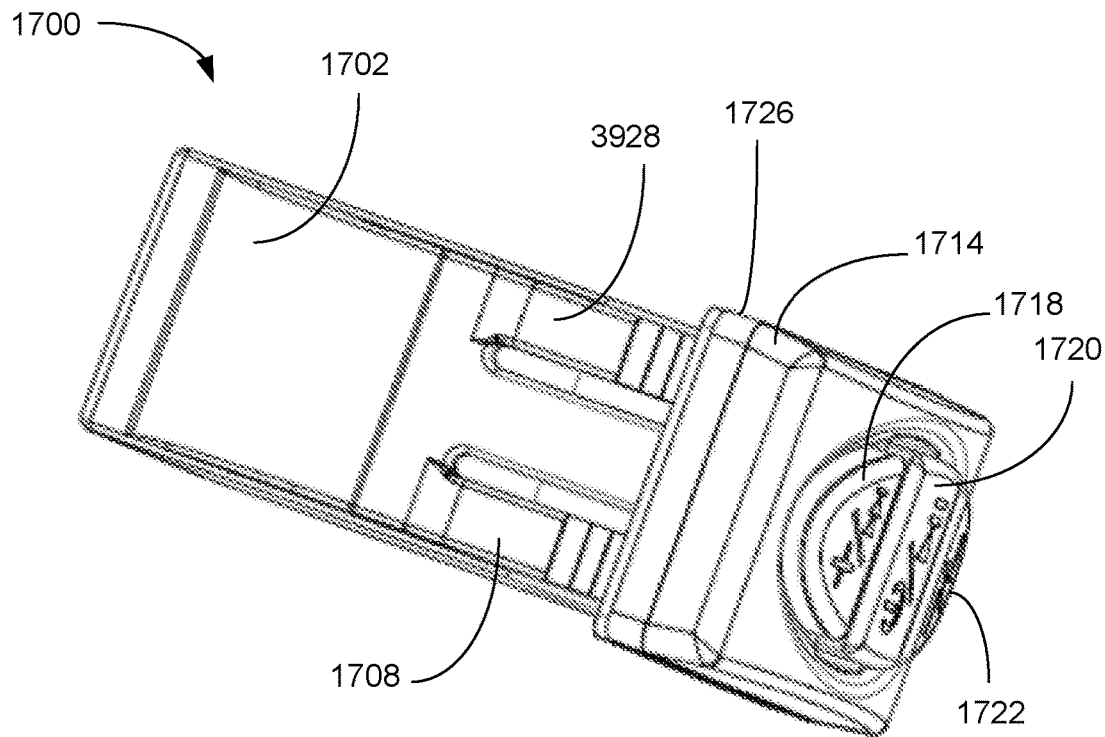
FIG. 39H is a side-bottom perspective view illustrating the exemplary fifth embodiment of the compact modular element of the modular entertainment control system of FIG. 17 after a seventh step of assembly, according to a preferred embodiment of the present invention.

FIG. 39H is a side-bottom perspective view illustrating the exemplary fifth embodiment of the compact modular element 1700 of the modular entertainment control system 3600 of FIG. 17 after a seventh step of assembly, according to a preferred embodiment of the present invention. The seventh step comprises snap-fitting the tactile interface convex front panel to housing 1702 to engage PCB front panel 3910.

Embodiments 100, 500, 900, 2500, and 2900, as well as embodiments not illustrated, are similarly constructed with a front panel PCB and PCBs, electronic component, circuit elements extending orthogonally from the front panel PCB into a housing.

Figure 40A:
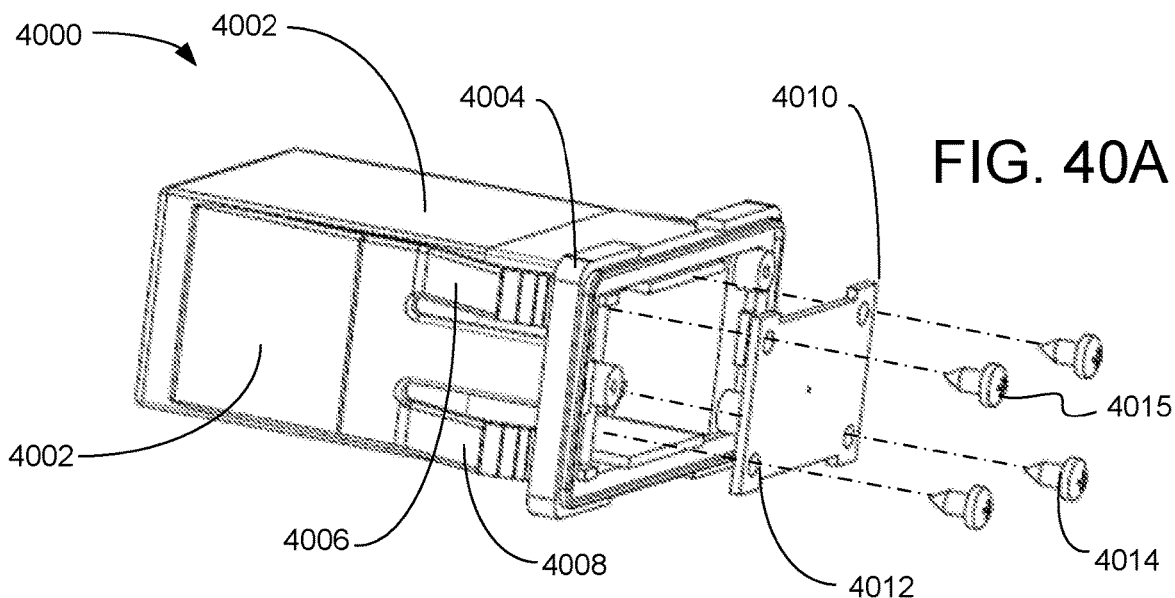
FIG. 40A is a side-bottom perspective view illustrating an exemplary ninth embodiment of the compact modular element of the modular entertainment control system in an initial step of assembly, according to a preferred embodiment of the present invention.

FIG. 40A is a side-bottom perspective view illustrating an exemplary ninth embodiment of the compact modular element 4000 of a modular entertainment control system, such as modular entertainment control system 3600, in an initial step of assembly, according to a preferred embodiment of the present invention. Compact modular element 4000 is a panel light. Support plate 4010 is aligned to be fastened inside housing 4002 using four fasteners 4014, and 4015 (two of four labeled) via fastener openings 4012 (one of four labeled). Housing 4002 supports bottom ratchet latches 4006 and 4008 as well as a front panel support 4004.

Figure 40B:
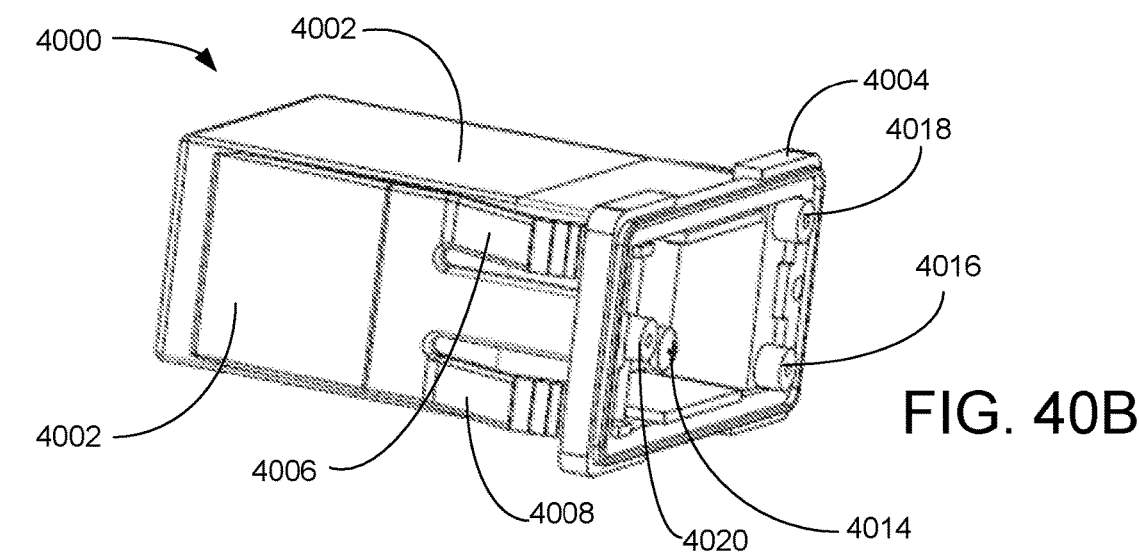
FIG. 40B is a side-bottom perspective view illustrating the exemplary ninth embodiment of the compact modular element of the modular entertainment control system of FIG. 40A after the initial step of assembly, according to a preferred embodiment of the present invention.

FIG. 40B is a side-bottom perspective view illustrating the exemplary ninth embodiment of the compact modular element 4000 of the modular entertainment control system of FIG. 40A after the initial step of assembly, according to a preferred embodiment of the present invention. Support plate 4010 is fastened inside housing 4002. Middle plate fastener receivers 4016, 4018, and 4020 are all visible in this view.

Figure 40C:
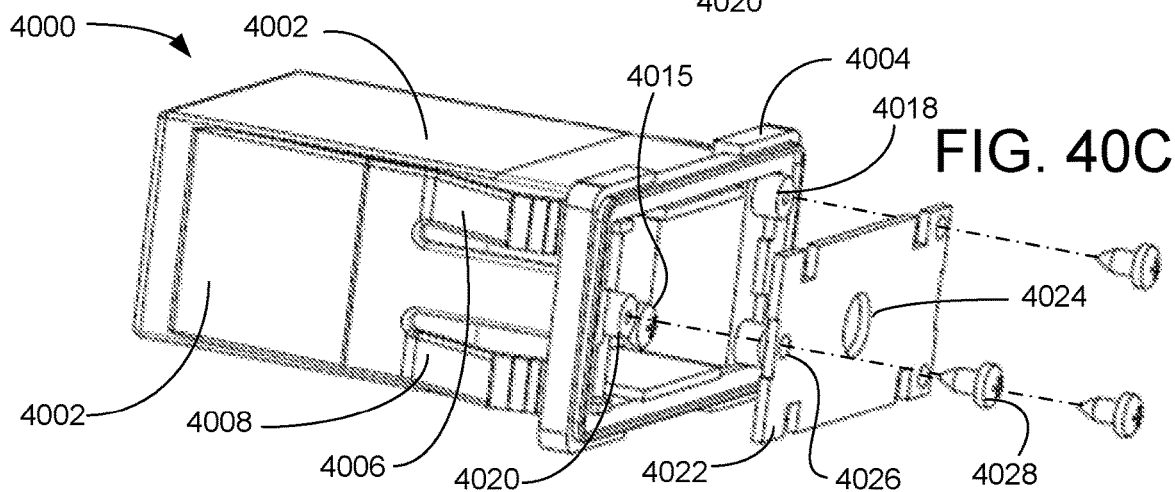
FIG. 40C is a side-bottom perspective view illustrating the exemplary ninth embodiment of the compact modular element of the modular entertainment control system of FIG. 40A in a second step of assembly, according to a preferred embodiment of the present invention.

FIG. 40C is a side-bottom perspective view illustrating the exemplary ninth embodiment of the compact modular element 4000 of the modular entertainment control system of FIG. 40A in a second step of assembly, according to a preferred embodiment of the present invention. Middle plate 4022 is aligned to be fastened into housing 4002 using three fasteners 4028 (one of three labeled) via respective fastener openings 4026 (one of three labeled) into three respective fastener receivers 4016, 4018, and 4020. Middle plate 4022 has a central opening 4024 to accommodate a light source.

Figure 40D:
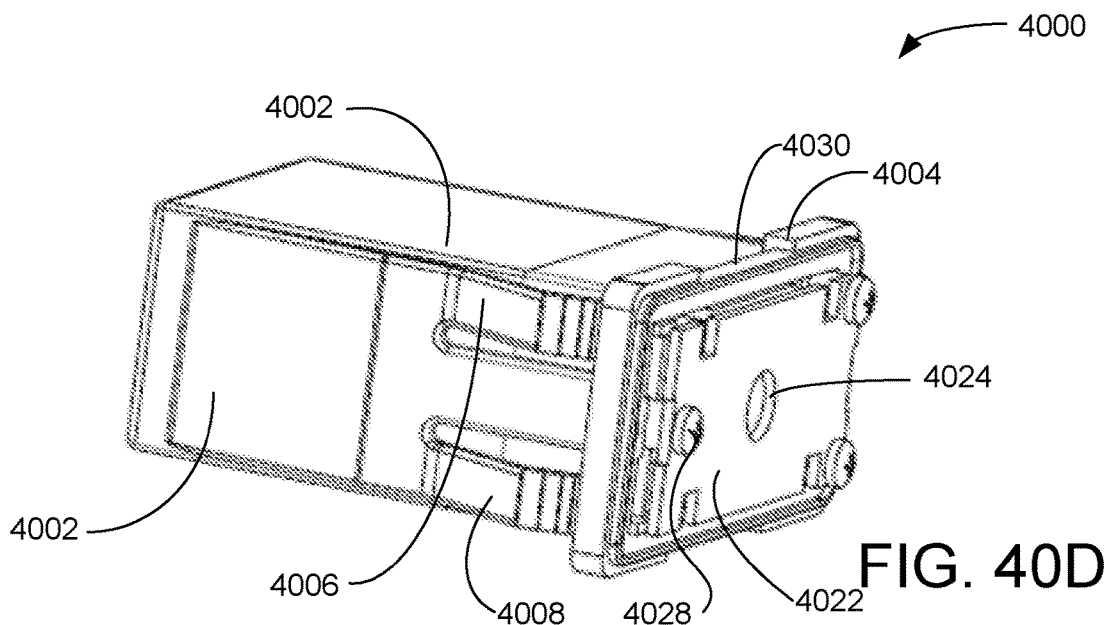
FIG. 40D is a side-bottom perspective view illustrating the exemplary ninth embodiment of the compact modular element of the modular entertainment control system of FIG. 40A after a second step of assembly, according to a preferred embodiment of the present invention.

FIG. 40D is a side-bottom perspective view illustrating the exemplary ninth embodiment of the compact modular element 4000 of the modular entertainment control system of FIG. 40A after a second step of assembly, according to a preferred embodiment of the present invention. Middle plate 4022 is fastened into housing 4002 using three fasteners 4028 (one of three labeled).

Figure 40E:
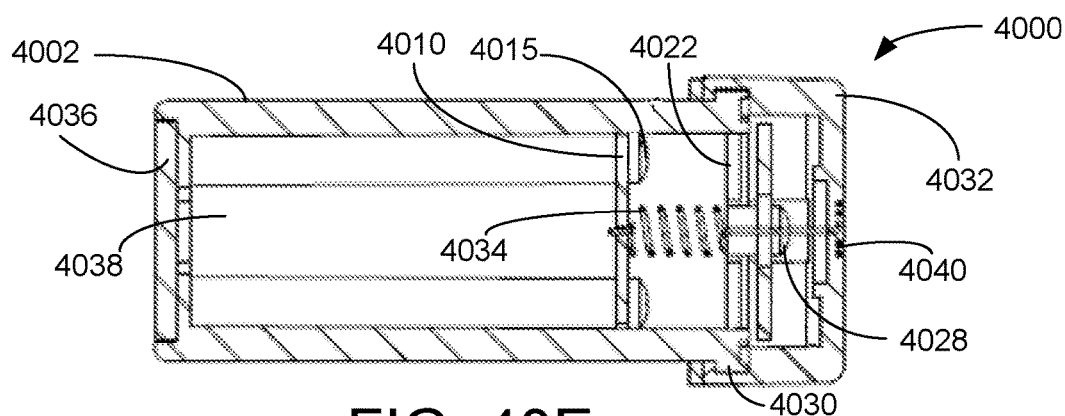
FIG. 40E is a top cross sectional view illustrating the exemplary ninth embodiment of the compact modular element of the modular entertainment control system of FIG. 40A after a third step of assembly, according to a preferred embodiment of the present invention.

FIG. 40E is a top cross sectional view illustrating the exemplary ninth embodiment of the compact modular element 4000 of the modular entertainment control system of FIG. 40A after a third step of assembly, according to a preferred embodiment of the present invention. PCB 4038 extends between support plate 4010 and the interior rear wall of housing 4002. Biasing mechanism 4034, illustrated as spring 4034, is supported on support plate 4010 and biases light source 4028 forward. A flexible portion 4040 of translucent cover 4030 enables manual toggling of light source 4028. Back plate 4036 provides conduits for conductors to PCB 438.

Figure 40F:
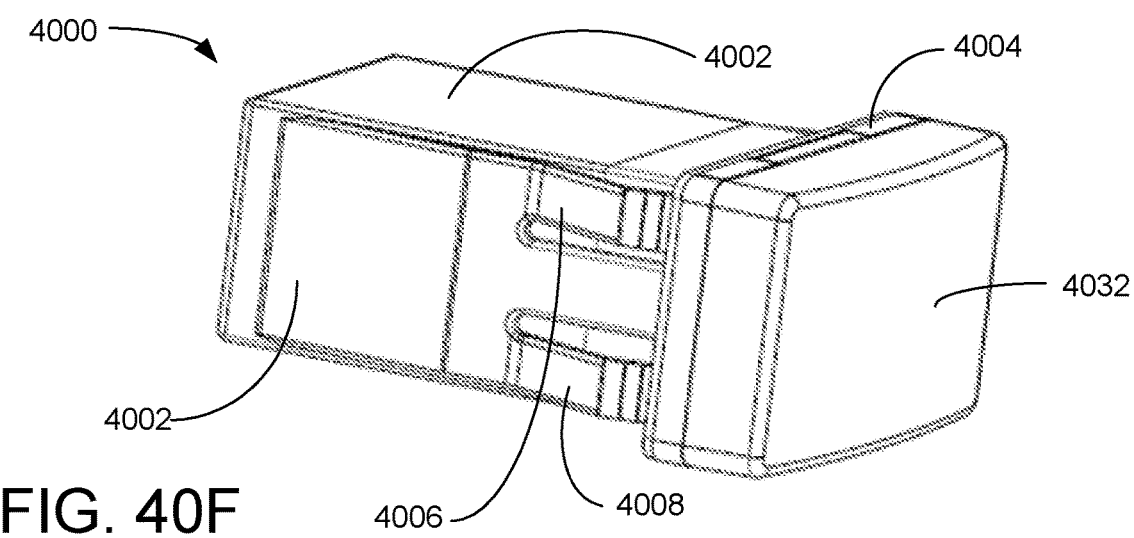
FIG. 40F is a side-bottom perspective view illustrating the exemplary ninth embodiment of the compact modular element of the modular entertainment control system of FIG. 40A in a second step of assembly, according to a preferred embodiment of the present invention.

FIG. 40F is a side-bottom perspective view illustrating the exemplary ninth embodiment of the compact modular element 4000 of the modular entertainment control system of FIG. 40A after a final step of assembly, according to a preferred embodiment of the present invention.

Translucent cover 4032 transits some of the light from light source 4028, when turned on.

We claim:

1. A modular entertainment control system having a plurality of snap-mounted multi-functional modules within a plurality of modular mounting frame, comprising:

a plurality of housings configured to be snap-in mounted to a plurality of modular mounting frames;

a front panel PCB affixed to each said housing of said plurality of housings;

at least two functional parts of said modular entertainment control system supported in each said front panel PCB;

at least a portion of an internal electronic circuit board supported within each said housing; and wherein said plurality of modular mounting frames comprise interlocking modular mounting frames.

2. The modular entertainment control system of claim 1, wherein one functional part of said at least two functional parts comprises at least two of:
   an audio input jack;
   a USB port;
   a push button that is a toggle switch;
   an electronic display screen; and
   a push button that controls:
      a first function when momentarily depressed and released; and
      a second function when continuously depressed.

3. The modular entertainment control system of claim 1, wherein said at least two functional parts comprises a dual-action knob having an axial motion part and a rotational motion part.

4. The modular entertainment control system of claim 1, wherein said at least a portion of an internal electronic circuit board comprises one of:
   an FM radio receiver;
   an electronic display driver;
   a volt meter;
   an auxiliary audio jack;
   a USB port;
   a compact single knob controller;
   switching logic;
   a short-range radio-frequency transceiver; and
   RGB LED control logic.

5. A modular entertainment control system having a plurality of snap-mounted multi-functional modules within a plurality of modular mounting frames, the system comprising:
   a plurality of housings configured to be snap-in mounted to a corresponding plurality of modular mounting frames;
   a front panel printed circuit board (PCB) affixed to each said housing of said plurality of housings;
   at least two functional parts of said modular entertainment control system supported in each said front panel PCB;
   wherein said at least two functional parts comprise two of:
      a USB port;
      an audio input jack;
      an electronic display screen for displaying a voltmeter reading;
      a multi-functional knob;
      a dual-function push button;
      a button to pair to other short-range radio frequency devices;
      an electronic display screen for displaying a radio channel; and
      a lighting control button.

6. The modular entertainment control system of claim 5, comprising at least a portion of an electronic circuit board extending orthogonally rearward from said front panel PCB within at least one housing of said plurality of housings.

7. The modular entertainment control system of claim 6, wherein said at least a portion of an electronic circuit board extending orthogonally comprises at least a portion of one of:
   an FM radio receiver;
   an electronic display driver;
   a volt meter;
   an auxiliary audio jack;
   a USB port;
   a compact single knob controller;
   switching logic;
   a short-range radio frequency transceiver; and
   RGB LED control logic.

8. The modular entertainment control system of claim 5, wherein one functional part of said at least two functional parts comprises a color selection button.

9. The modular entertainment control system of claim 5, wherein one functional part of said at least two functional parts comprises a USB port.

10. The modular entertainment control system of claim 5, wherein said at least two functional parts comprises a dual-action actuator that has an axial motion part and a rotational motion part.

11. The modular entertainment control system of claim 5, wherein one functional part of said at least two functional parts comprises an electronic display screen.

12. The modular entertainment control system of claim 5, wherein said plurality of modular mounting frames is configurable to have two or more ports.

13. The modular entertainment control system of claim 5, wherein one functional part of said at least two functional parts comprises a push button.

14. The modular entertainment control system of claim 13, wherein said push button comprises a toggle switch.

15. The modular entertainment control system of claim 13, wherein said push button controls:
   a first function when momentarily depressed and released; and
   a second function when continuously depressed.

16. A modular entertainment control system having a plurality of snap-mounted multi-functional modules within a corresponding plurality of modular mounting frames, comprising:
   a plurality of housings configured to be snap-in mounted to a corresponding plurality of modular mounting frames;
   a front panel PCB affixed to each said housing of said plurality of housings;
   at least two functional parts of said modular entertainment control supported by each said front panel PCB;
   wherein said at least two functional parts comprise two of:
      a USB port;
      an audio input jack;
      an electronic display screen for displaying a voltmeter reading;
      a multi-functional knob;
      a dual-function push button;
      an electronic display screen for displaying a radio channel; and
      a lighting control button; and
   at least a portion of an electronic circuit board extending orthogonally rearward from said front panel within at least one housing of said plurality of housings.

17. The modular entertainment control system of claim 16, wherein said at least a portion of an electronic circuit board extending orthogonally comprises at least a portion of one of:

an FM radio receiver;
a volt meter;
an auxiliary audio jack;
a USB port;
a compact single knob controller;
switching logic;
a short-range radio-frequency transceiver; and
RGB LED control logic.

18. The modular entertainment control system of claim 16, wherein said plurality of modular mounting frames is configurable to have two or more ports.

19. The modular entertainment control system of claim 16, wherein one functional part of said at least two functional parts comprises:
a push button that is a toggle switch; and
a push button that controls:
    a first function when momentarily depressed and released; and
    a second function when continuously depressed.

20. The modular entertainment control system of claim 19, wherein said at least two functional parts comprises a dual-action actuator having an axial motion part and a rotational motion part.

* * * * *